(12) United States Patent　　(10) Patent No.: US 7,130,794 B2
Saito　　(45) Date of Patent: Oct. 31, 2006

(54) RECEIVED SPEECH SIGNAL PROCESSING APPARATUS AND RECEIVED SPEECH SIGNAL REPRODUCING APPARATUS

(75) Inventor: Mutsumi Saito, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 150 days.

(21) Appl. No.: 10/095,976

(22) Filed: Mar. 12, 2002

(65) Prior Publication Data

US 2002/0099538 A1　Jul. 25, 2002

Related U.S. Application Data

(63) Continuation of application No. PCT/JP99/05751, filed on Oct. 19, 1999.

(51) Int. Cl.
*G01L 19/14* (2006.01)
(52) U.S. Cl. ...................................... 704/205; 704/205
(58) Field of Classification Search ................ 704/226, 704/219, 262, 206, 208
See application file for complete search history.

(56) References Cited

U.S. PATENT DOCUMENTS

| | | | | |
|---|---|---|---|---|
| 4,038,503 A | | 7/1977 | Moshier | |
| 4,803,732 A | * | 2/1989 | Dillon | 381/320 |
| 5,361,324 A | * | 11/1994 | Takizawa et al. | 704/233 |
| 5,699,382 A | * | 12/1997 | Shoham et al. | 375/243 |
| 5,737,720 A | * | 4/1998 | Miyamori et al. | 704/200.1 |
| 5,790,671 A | * | 8/1998 | Cooper | 381/57 |
| 5,999,897 A | * | 12/1999 | Yeldener | 704/207 |
| 6,088,668 A | * | 7/2000 | Zack | 704/225 |
| 2002/0138254 A1 | * | 9/2002 | Isaka | 704/208 |

FOREIGN PATENT DOCUMENTS

| | | |
|---|---|---|
| EP | 0 596 623 A2 | 5/1994 |
| EP | 0 674 415 A1 | 9/1995 |
| EP | 0 717 547 A2 | 6/1996 |
| EP | 0 767 570 A2 | 4/1997 |
| JP | 59094796 | 5/1984 |
| JP | 62289899 | 12/1987 |
| JP | 9130453 | 5/1997 |
| WO | WO 98/05150 | 2/1998 |

* cited by examiner

*Primary Examiner*—David Hudspeth
*Assistant Examiner*—Jakieda R. Jackson
(74) *Attorney, Agent, or Firm*—Katten Muchin Rosenman LLP

(57) ABSTRACT

The present invention relates to a received speech signal processing apparatus suitable for use in a mobile communication terminal such as a portable telephone. The received speech signal processing apparatus (5) is arranged to include a frequency band partitioning unit (8) for partitioning a received speech signal into a plurality of frequency bands in the frequency domain and a received speech signal compressing unit (9) for effecting a compression processing on respective speech signal components involved in respective frequency bands at a ratio differing depending on the respective received speech signal which is partitioned into a plurality of frequency bands. Since the compression processing is effected on the received speech signal at the compression ratio suitable for each frequency band, an articulate speech can be reproduced from the received speech signal.

2 Claims, 20 Drawing Sheets

F I G. 5 (a)
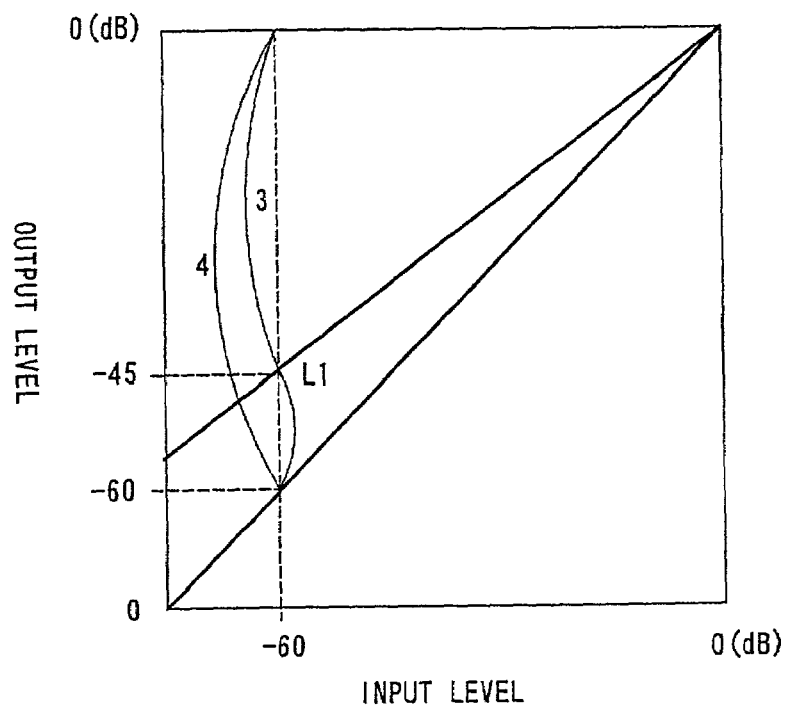
F I G. 5 (b)
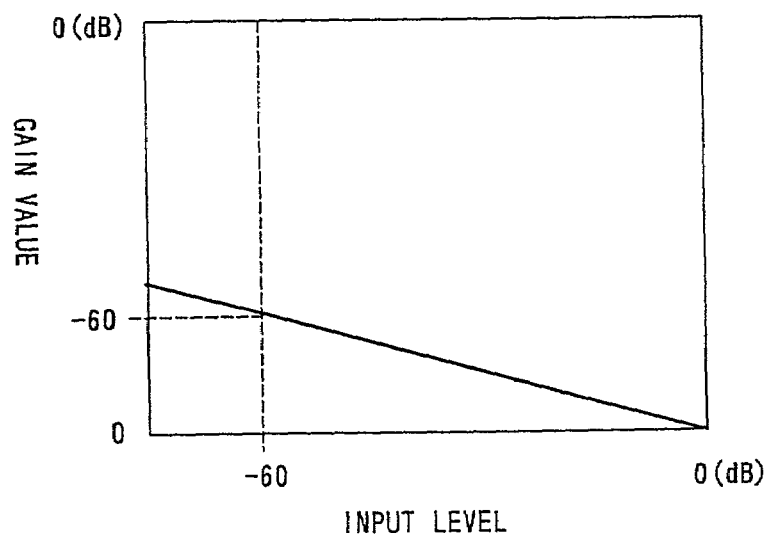

F I G. 7
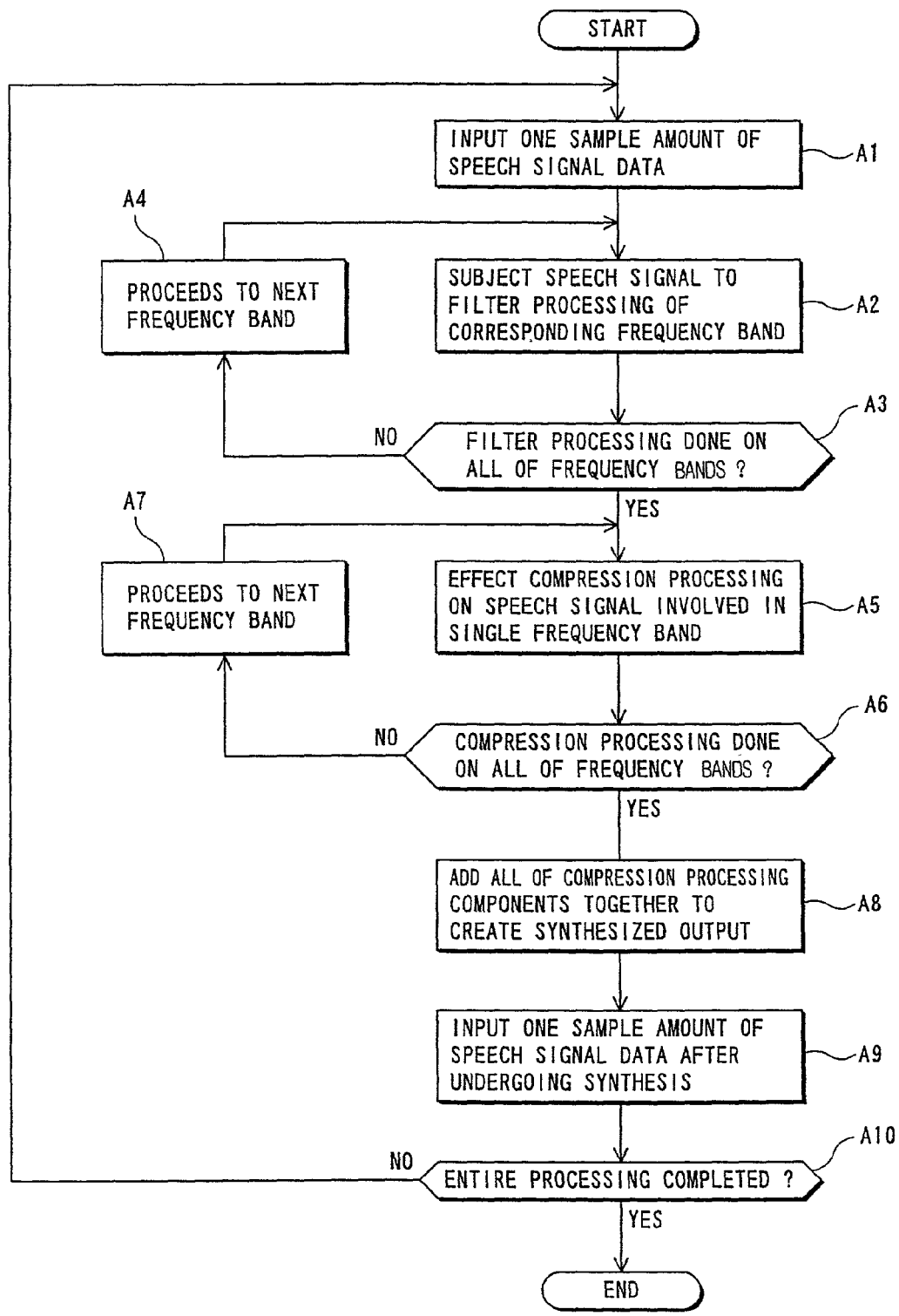

RECEIVED SPEECH SIGNAL

RECEIVED SPEECH SIGNAL AFTER UNDERGOING ABSOLUTE VALUE CONVERTING PROCESSING

GAIN

GAIN PROFILE AFTER UNDERGOING SMOOTHING PROCESSING

RECEIVED SPEECH SIGNAL AFTER UNDERGOING GAIN MULTIPLICATION PROCESSING

F I G. 1 2

|  | SPEECH SIGNAL HAVING NOT UNDERGONE PROCESSING | SPEECH SIGNAL HAVING UNDERGONE PROCESSING |
|---|---|---|
| NO NOISE ENVIRONMENT | 68.50 | 68.25 |
| ENVIRONMENT OF NOISE TYPE A | 48.75 | 60.00 |
| ENVIRONMENT OF NOISE TYPE B | 52.50 | 61.00 |

( SCORES ARE MADE ON A MAXIMUM SCALE OF 70 POINTS )

F I G. 14
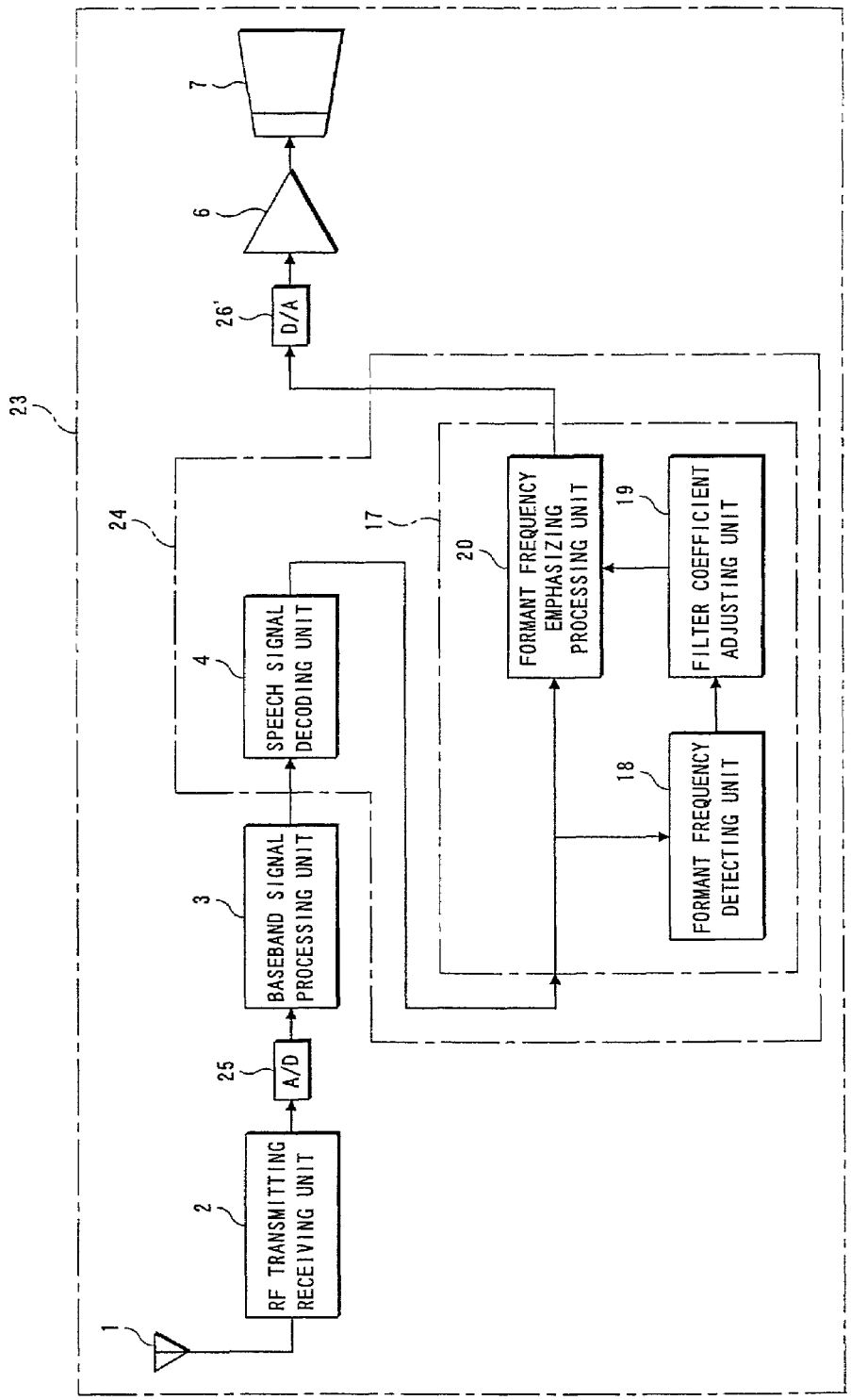

F I G. 19

|  | SPEECH SIGNAL HAVING NOT UNDERGONE PROCESSING | SPEECH SIGNAL HAVING UNDERGONE PROCESSING |
|---|---|---|
| NO NOISE ENVIRONMENT | 68.50 | 66.50 |
| ENVIRONMENT OF NOISE TYPE A | 48.75 | 58.50 |
| ENVIRONMENT OF NOISE TYPE B | 52.50 | 56.50 |

( SCORES ARE MADE ON A MAXIMUM SCALE OF 70 POINTS )

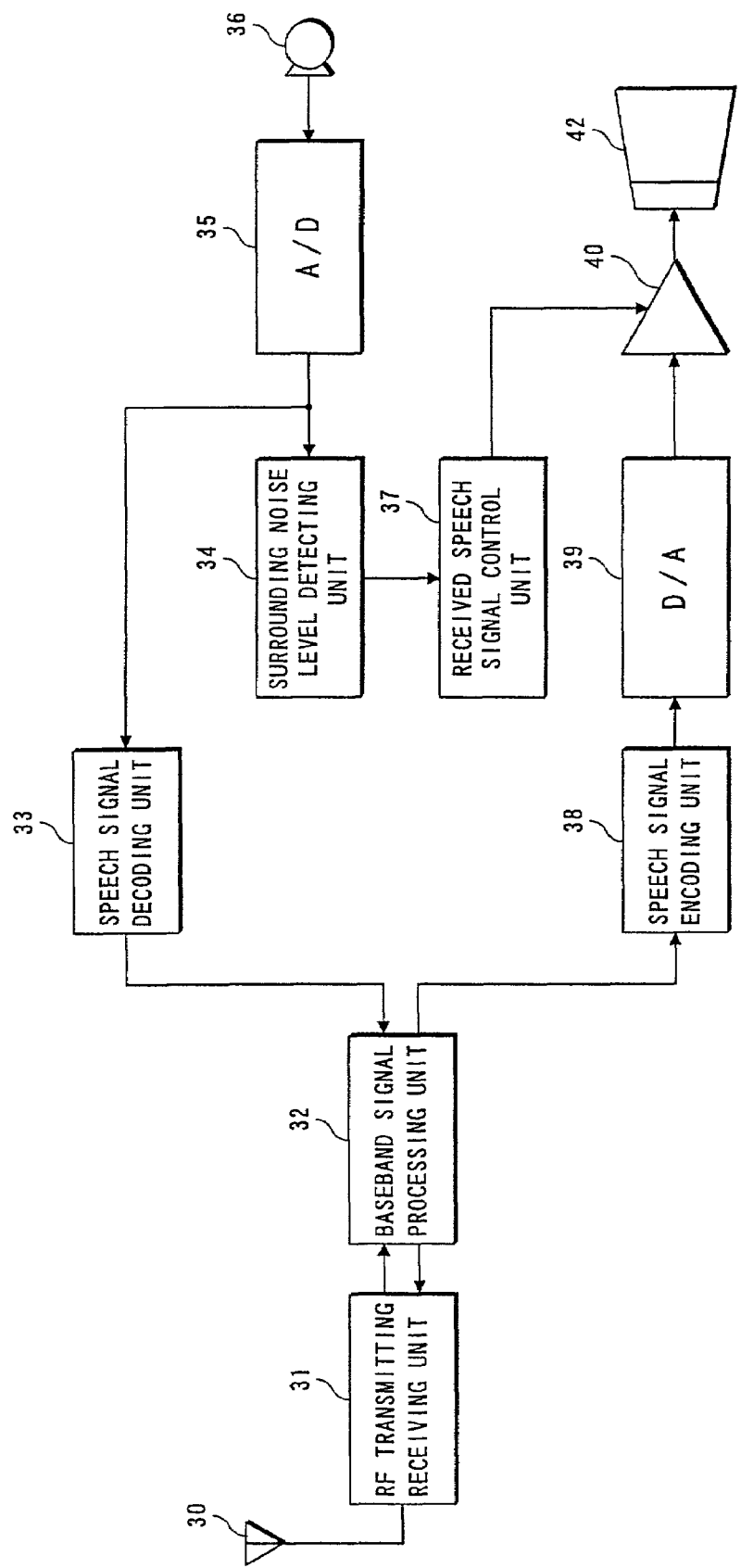

RECEIVED SPEECH SIGNAL PROCESSING APPARATUS AND RECEIVED SPEECH SIGNAL REPRODUCING APPARATUS

This application is a continuation of international application number PCTJP99/05751, filed Oct. 19, 1999.

TECHNICAL FIELD

The present invention relates to a received speech signal processing apparatus and a received speech signal reproducing apparatus suitable for use in a mobile communication terminal such as a portable telephone for improving articulation of the received speech.

BACKGROUND ART

Recently, mobile communication terminals such as portable telephones have widely spread. Such a mobile communication terminal is often utilized outdoor and hence it frequently suffers from surrounding noise such as traffic noise (noise generated around a person utilizing the mobile communication terminal). Therefore, if such noise becomes so serious, then it becomes often difficult for the user to hear the received speech. The reason why such phenomenon is brought about is, the surrounding noise effects a masking effect, which makes it difficult for the user to hear the received speech when the speech volume becomes lowered, with the result that the articulation is lowered.

As for the surrounding noise mixed into the speech signal transmitted from the transmission side, a mobile communication terminal on the transmission side is equipped with a noise canceller. Therefore, improvement can be expected in the countermeasure against the noise generated around the terminal of the transmission side.

However, it is impossible for the communication system to control the noise generated around the terminal of the receiver side. Therefore, the user of the mobile communication terminal who is talking in a surrounding noise environment will suffer from a hard situation in hearing the opponent's speech.

For this reason, as a countermeasure against the noise generated around the terminal of the receiver side, the user on the receiving side adjust the volume at which the user hears the received speech. Alternatively, the mobile communication terminal may be arranged to detect the surrounding noise level automatically so as to adjust the volume of the received speech in response to the detected surrounding noise level.

FIG. 20 is a block diagram of a speech signal transmitting receiving apparatus of a portable telephone apparatus disclosed in Japanese Patent Laid-open gazette No. HEI 9-130453. In an apparatus 42 shown in FIG. 20, a speech picked up by a transmitting microphone 36 converts the speech into an electric signal to create an input signal, and this input signal is formed into digital data by an analog-to-digital (A/D) converter 35. The digital data is supplied to a speech signal encoding unit 33 and transmitted from an antenna 30 through a baseband signal processing unit 32 and an RF transmitting receiving unit 31 as a radio signal.

Also, the output of the analog-to-digital converter 35 is supplied to a surrounding noise level detecting circuit 34. The surrounding noise detecting circuit 34 detects a surrounding noise level contained in a signal outputted from the analog-to-digital converter 35. Further, a received speech signal controlling circuit 37 adjusts a speed of increase and decrease of received speech volume in response to the increase and decrease of the surrounding noise level detected by the surrounding noise detecting circuit 34.

On the other hand, a radio signal received by the antenna 30 is supplied to a speech signal decoder 38 through the RF transmitting receiving unit 31 and the baseband signal processing unit 32. The speech signal having undergone decoding processing in the speech signal decoder 38 is converted into analog data by a digital-to-analog converter 39 and the resultant data is supplied to a variable gain amplifier 40. The variable gain amplifier 40 amplifies the volume of analog data in accordance with the speed of increase and decrease of the received speech volume adjusted by the received speech signal controlling circuit 37. Thus, a speech as a sound emanates from a speaker 42.

As described above, the speed of increase and decrease of the received speech volume is adjusted. Therefore, even if the surrounding noise level abruptly changes from a high level to a low level, the user can be protected from being brought into a state in which an ear of the user is temporarily made insensible in hearing the speech due to the surrounding noise level which has been kept so far. That is, the hearing environment of the user on the receiving side can be protected from being deteriorated. In this case, it is necessary for the communication terminal to be equipped with a circuit which discriminates a speech signal from the surrounding noise upon detecting the surrounding noise level, a circuit for detecting the surrounding noise level, or a circuit for adjusting the speed of increase and decrease of the received speech volume in response to the surrounding noise level, with the result that the size of the circuit could be enlarged.

Meanwhile, Japanese Patent Laid-open gazette No. HEI 8-163227 discloses a technology. That is, the surrounding noise level is detected when a talker on the transmitting side keeps quiet, whereby the level of the pure surrounding noise without the speech of the talker is detected and the received speech volume can be adjusted properly based on the detected noise level. In this case, of the signals picked up by the microphone, a signal falling in a speech band and a predetermined threshold value are compared with each other to determine whether the talker on the transmitting side is talking or listening to the opponent's talk. Therefore, it is necessary for the communication terminal to be provided with a circuit for recognition, with the result that the size of the circuit could be also enlarged.

Further, according to the above-described method in which the volume is adjusted in response to the surrounding noise level, in general, it is a complicated task to design a circuit concerning the detection or amplification of the surrounding noise level. Also, software development for the circuit is a hard task. Thus, the size of the circuit or software will be enlarged.

Furthermore, according to the above-described method, the volume of speech is uniformly amplified over the whole frequency bands, and hence the amplification can become excessive in a part of the frequency band. As a result, the speech can be distorted or the speech cannot provide a satisfactory articulation in other part of the frequency bands.

The present invention is made in view of the above aspect. Therefore, it is an object of the present invention to provide a received speech signal processing apparatus or a received speech signal reproducing apparatus in which the volume adjustment is effected in response not to the change of the surrounding noise level but to a frequency characteristic of the speech signal so that a fine adjustment concerning a speech adjustment or the like is obviated and further a complicated circuit such as a circuit for discriminating a speech signal from a non-speech signal or a circuit for controlling the processing of transmission and reception is also obviated, whereby the size of the circuit or the software can be made simple and a stable articulation can be obtained.

DISCLOSURE OF THE INVENTION

According to the present invention, in order to attain the above object, there is provided a received speech signal processing apparatus including a frequency band partitioning unit for partitioning a received speech signal into a plurality of frequency bands in the frequency domain, and a received speech signal compressing unit for effecting a compression processing on respective speech signal components involved in the respective frequency bands deriving from the partitioning of the frequency band partitioning unit at a ratio differing depending on the respective received speech signal which is partitioned into a plurality of frequency bands.

According to the above arrangement, the received speech signal can be subjected to a compression processing which is arranged for each partitioned frequency band. Therefore, the speech signal can be free from distortion or an influence due to a masking effect, and an articulate speech signal can be obtained. Moreover, since the received speech signal compression processing is independent of the fluctuation of the volume of the surrounding noise, circuits for discriminating the speech signal from the surrounding noise or detecting the level of the surrounding noise can be obviated. Also, a software therefor can be obviated. Therefore, it becomes possible to suppress the size of the circuits or the software, with the result that the mobile communication terminal can be small-sized.

According to the present invention, there is provided a received speech signal processing apparatus including a formant frequency detecting unit for detecting a formant frequency contained in a received speech signal and a formant frequency emphasizing processing unit for emphasizing the formant frequency, on the received speech signal, detected by the formant frequency detecting unit.

According to the above arrangement, the formant frequency contained in the received speech signal can be emphasized, and an articulate speech signal can be obtained. Moreover, since the received speech signal compression processing is independent of the fluctuation of the volume of the surrounding noise, circuits for discriminating the speech signal from the surrounding noise or detecting the level of the surrounding noise can be obviated. Also, a software therefor can be obviated. Therefore, it becomes possible to suppress the size of the circuits or the software, with the result that the mobile communication terminal can be small-sized.

According to the present invention, there is provided a received speech signal reproducing apparatus comprising a speech signal decoding unit for decoding an encoded received speech signal and a received speech signal processing section for partitioning a received speech signal decoded by the speech signal decoding unit into a plurality of frequency bands in the frequency domain, and effecting a compression processing on respective partitioned speech signal components at a ratio differing depending on respective received speech signal which is partitioned into a plurality of frequency bands.

According to the above arrangement, the received speech signal can be subjected to a compression processing which is arranged for each partitioned frequency band. Therefore, the speech signal can be free from distortion or an influence due to a masking effect, and an articulate speech signal can be obtained. Moreover, since the received speech signal compression processing is independent of the fluctuation of the volume of the surrounding noise, circuits for discriminating the speech signal from the surrounding noise or detecting the level of the surrounding noise can be obviated. Also, a software therefor can be obviated. Therefore, it becomes possible to suppress the size of the circuits or the software, with the result that the mobile communication terminal can be small-sized.

Further, according to the present invention, there is provided a received speech signal reproducing apparatus including a speech signal decoding unit for decoding an encoded received speech signal and a received speech signal processing unit for detecting a formant frequency contained in the received speech signal decoded by the speech signal decoding unit and emphasizing the detected formant frequency, on the received speech signal.

According to the above arrangement, the formant frequency contained in the received speech signal can be emphasized, and an articulate speech signal can be obtained. Moreover, since the received speech signal compression processing is independent of the fluctuation of the volume of the surrounding noise, circuits for discriminating the speech signal from the surrounding noise or detecting the level of the surrounding noise can be obviated. Also, a software therefor can be obviated. Therefore, it becomes possible to suppress the size of the circuits or the software, with the result that the mobile communication terminal can be small-sized.

BRIEF DESCRIPTION OF THE DRAWINGS

FIG. 5 (a) is a diagram showing one example of a relationship between an input level at a gain calculating unit and a target output level;

FIG. 5(b) is a diagram showing one example of a relationship between an input level at the gain calculating unit and an amplified gain value;

FIG. 7 is a flowchart for explaining a compression processing effected on every frequency band of the first embodiment of the present invention;

FIG. 12 is a table showing a result of speech articulation test about a speech signal which undergoes the compression processing separately effected on respective frequency bands according to the first embodiment of the present invention;

FIG. 14 is a block diagram showing in more detail a receiving section of the mobile communication terminal according to the first embodiment of the present invention;

FIG. 19 is a table showing a result of speech articulation test about a received speech signal which undergoes the formant emphasizing processing according to the second embodiment of the present invention;

FIG. 20 is a block diagram of a speech signal transmitting receiving apparatus employed in a conventional portable telephone apparatus.

BEST MODE FOR CARRYING OUT THE INVENTION (A) Description of First Embodiment of Present Invention FIG. 1 is a block diagram of a mobile communication terminal 21 according to a first embodiment of the present invention. The mobile communication terminal 21 is a portable telephone or the like which is capable of transmitting or receiving signals such as speech signals by means of a radio wave signal. As shown in FIG. 1, the mobile communication terminal is arranged to include an antenna 1, an RF transmitting receiving unit 2, an analog-to-digital converter 25, a digital-to-analog converter 26, a baseband signal processing unit 3, a received speech signal reproducing apparatus 22, a digital-to-analog converter 26', an amplifier 6, a speaker 7, a transmitting microphone 29, an amplifier 28, an analog-to-digital converter 25', and a speech signal encoding unit 27.

Figure 1:
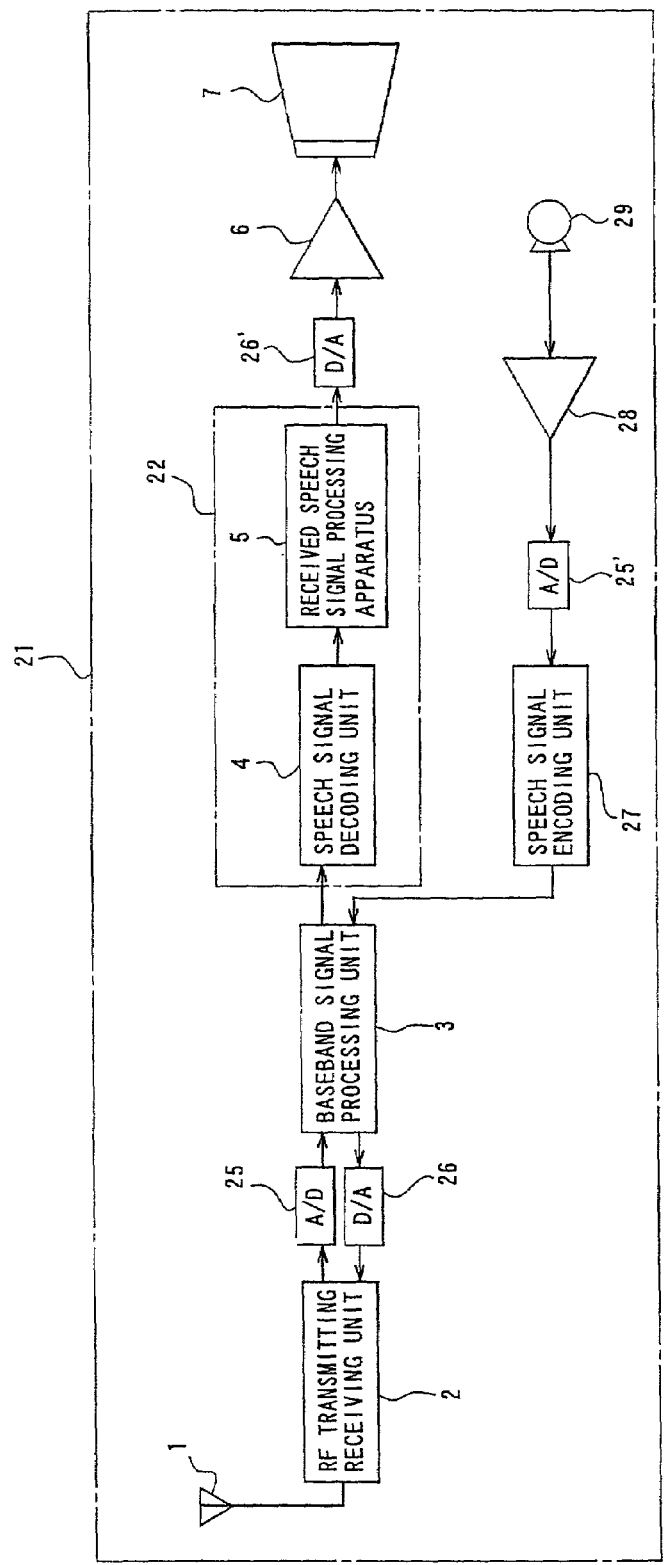
FIG. 1 is a block diagram showing a mobile communication terminal according to a first embodiment of the present invention.

The antenna 1 is a device for transmitting and receiving a radio signal. The RF transmitting receiving unit 2 is a unit for demodulating or modulating an RF (Radio Frequency) signal received by the antenna 1. The analog-to-digital converter 25 is a unit for converting a signal supplied from the RF transmitting receiving unit 2 into digital data. The baseband signal processing unit 3 is a unit for subjecting a signal from the analog-to-digital converter 25 to a baseband processing and also subjecting a signal from the speech signal encoding unit 27 to the baseband processing.

The received speech signal reproducing apparatus 22 is a section for decoding the baseband signal from the baseband signal processing unit 3 into a received speech signal and subjecting the decoded speech signal to a predetermined compression processing. The digital-to-analog converter 26' is a unit for converting the speech signal from the received speech signal reproducing apparatus 22 into analog data. The amplifier 6 amplifies the speech signal which has been formed into analog data by the digital-to-analog converter 26'. Further, the speaker 7 is a unit for emanating a speech of the speech signal outputted from the amplifier 6.

The transmitting microphone 29 is a device for converting a speech of a talker on the transmitting side into a signal. The amplifier 28 is a unit for amplifying the signal from the transmitting microphone 29. The analog-to-digital converter 25' is a unit for converting the signal from the amplifier 28 into digital data. The speech signal encoding unit 27 is a unit for encoding the digital data from the analog-to-digital converter 25'. The speech signal decoding unit 27 is a unit for encoding the signal from the amplifier 28. Further, the digital-to-analog converter 26 is a unit for converting the baseband signal from the baseband signal processing unit 3 into analog data.

The received speech signal reproducing apparatus 22 is arranged to include a speech signal decoding unit 4 and a received speech signal processing apparatus 5, each of which being arranged as a digital circuit. The speech signal decoding unit 4 is a unit for decoding the encoded received speech signal. In this case, the speech signal decoding unit 4 can be composed of a decoder employing a vector sum excited linear prediction (VSELP; Vector Sum Excited Linear Prediction) system or an ADPCM (Adaptive Differential Pulse Code Modulation) system, for example. This vector sum excited linear prediction system is sometimes referred to as a vector sum oscillated linear prediction system. However, both of them mean the same thing. The received speech signal processing apparatus 5 is an apparatus for partitioning a received speech signal decoded by the speech signal decoding unit 4 into a plurality of speech signal components involved in respective frequency bands in the frequency domain, and effecting a compression processing on each of the plurality of speech signal components involved in the respective frequency bands at a ratio differing depending on the respective frequency bands.

In this way, the radio signal received by the antenna 1 is subjected to a demodulating processing in the RF transmitting receiving unit 2. Thereafter, the demodulated output is converted into digital data by the analog-to-digital converter 25. Then, the digital data is subjected to the baseband processing in the baseband signal processing unit 3. The signal having been subjected to the baseband processing is decoded by the speech signal decoding unit 4 so as to create a received speech signal. This speech signal is subjected to a predetermined compression processing in the received speech signal processing apparatus 5, and then converted into analog data by the digital-to-analog converter 26'. Thereafter, the analog data is amplified by the amplifier 6 and the speaker 7 emanates the corresponding sound.

On the other hand, a speech signal supplied from the transmitting microphone 29 is amplified by the amplifier 28, and this amplified speech signal is converted into digital data by the analog-to-digital converter 25'. Thereafter, the digital data is encoded by the speech signal encoding unit 27. This encoded speech data is subjected to a baseband processing in the baseband signal processing unit 3. The signal having been undergone the baseband processing is converted into analog data by the digital-to-analog converter 26. The analog data is supplied to the RF transmitting receiving unit 2. Thereafter, the analog data supplied from the digital-to-analog converter 26 is subjected to a modulation in the RF transmitting receiving unit 2 and transmitted away from the antenna 1.

As for a block having a function of a transmitting system which is described in the following description of the respective embodiments, the transmitting function will not be described in detail, and description will be principally made on a function of a receiving system.

Figure 2:
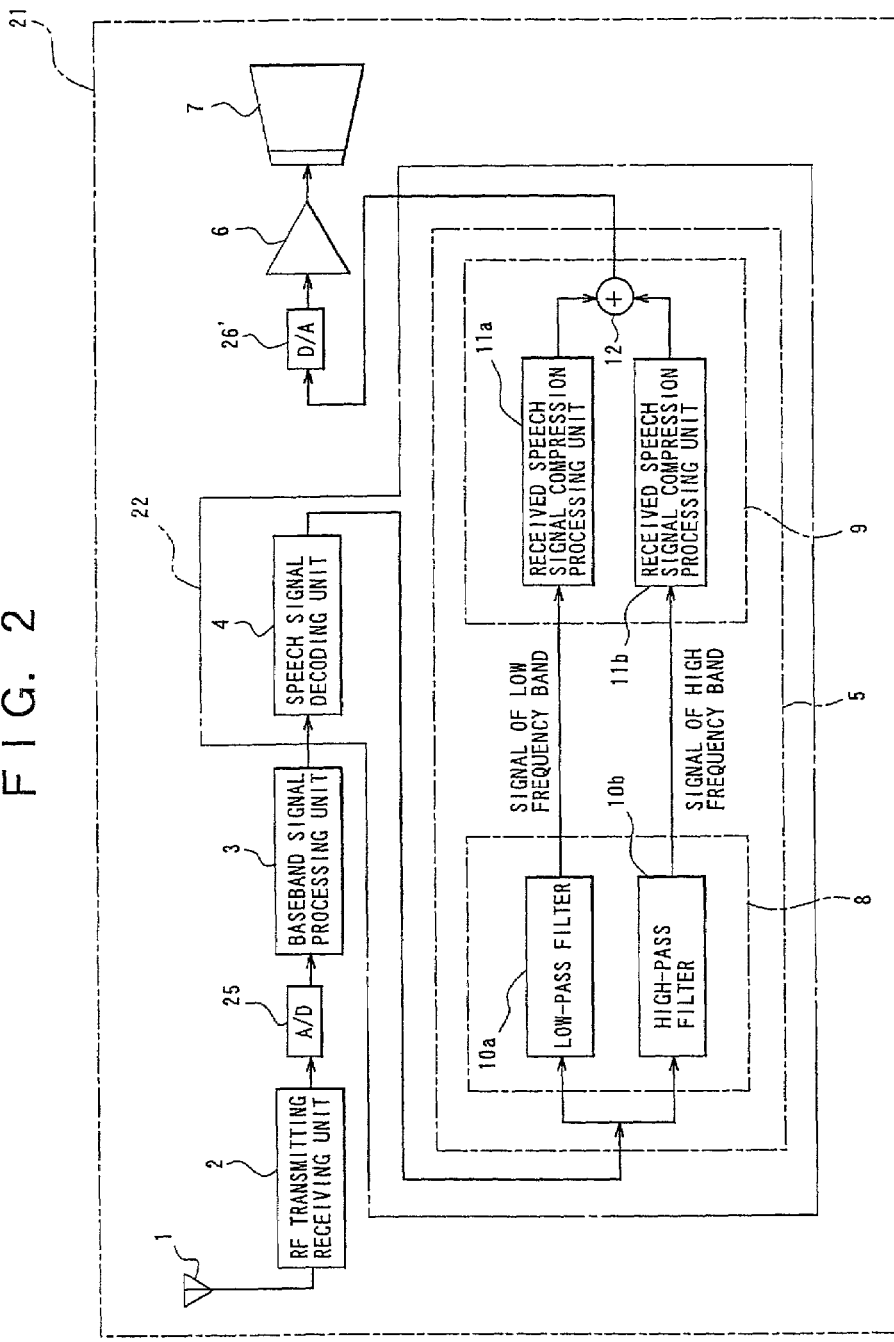
FIG. 2 is a block diagram showing in more detail a received speech signal reproducing apparatus provided in a receiving section of the mobile communication terminal according to the first embodiment of the present invention.

FIG. 2 is a block diagram showing in more detail the received speech signal reproducing apparatus 22 provided in the receiving section of the mobile communication terminal 21 as the first embodiment of the present invention. As shown in detail in FIG. 2, the received speech signal processing apparatus 5 is arranged to include a frequency band partitioning unit 8 composed of digital circuits and a received speech signal compression processing unit 9 also composed of digital circuits.

The frequency band partitioning unit 8 is a unit for partitioning the received speech signal supplied from the speech signal decoding unit 4 into a plurality of speech signal components involved in respective frequency bands (in the present embodiment, two components) in the frequency domain. The frequency band partitioning unit 8 is arranged to include a low-pass filter (digital filter) 10a and a high-pass filter (digital filter) 10b.

Figure 4:
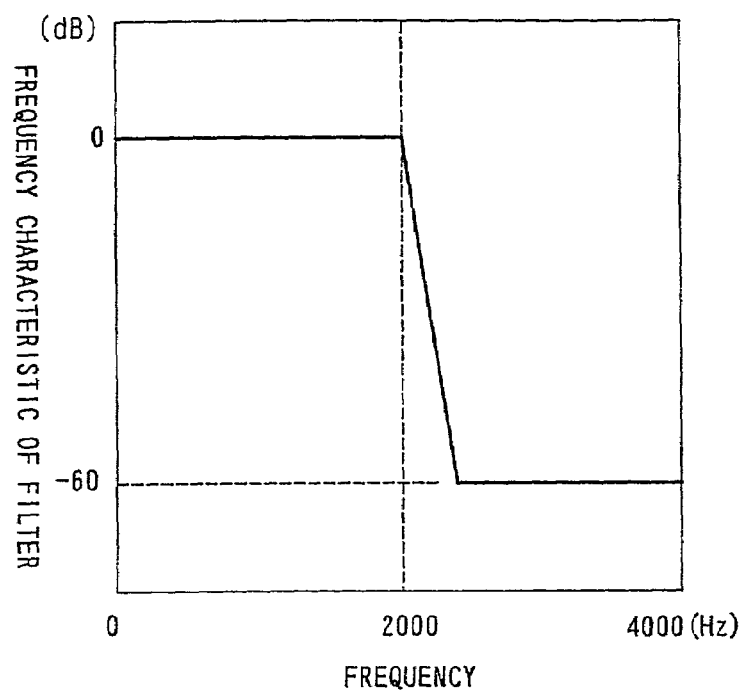
FIG. 4(a) is a diagram showing one example of a frequency characteristic of a low-pass filter.
FIG. 4(b) is a diagram showing one example of a frequency characteristic of a high-pass filter.
Figure 4:
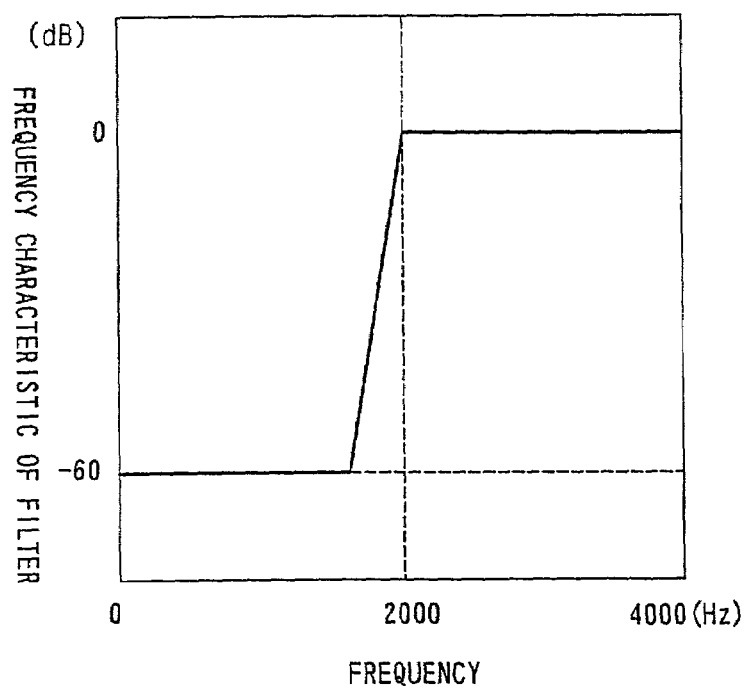

FIG. 4(*a*) is a diagram showing one example of a frequency characteristic of the low-pass filter 10a, and FIG. 4(*b*) is a diagram showing one example of a frequency characteristic of the high-pass filter 10b. As will be understood from these diagrams, the low-pass filter 10a has a frequency characteristic allowing to pass a received speech signal which is contained in a frequency band of 2000 Hz or below of the whole received speech signal decoded by the speech signal decoder 4. Conversely, the high-pass filter 10b has a frequency characteristic allowing to pass a received speech signal which is contained in a frequency band of 2000 Hz or more of the whole received speech signal decoded by the speech signal decoder. Therefore, it follows that the frequency band partitioning unit 8 is a unit for partitioning the received speech signal into a speech signal component contained in the frequency band of 2000 Hz or below and a speech signal component contained in the frequency band of 2000 Hz or more. It is needless to say that the threshold frequency for partitioning the whole frequency range may be any frequency other than 2000 Hz. Further, any band-pass filter (Band Pass Filter) or the like may be introduced so as to divide the speech signal contained in the whole frequency range into three or more components.

The received speech signal compressing unit 9 (see FIG. 2) is a unit for effecting a compression processing on the speech signal components contained in each of the plurality of frequency bands deriving from the partitioning of the frequency band partitioning unit 8 at a ratio differing depending on each frequency bands depending on the respective received speech signal which is partitioned into a plurality of frequency bands. In order to attain this purpose, the received speech signal compressing unit is arranged to include two kinds of received speech signal compression processing units 11a and 11b for compressing the partitioned speech signal components deriving from the partitioning of the frequency band partitioning unit 8 at the ratio differing depending on respective frequency bands which correspond to the low frequency band and the high frequency band, respectively.

Figure 3:
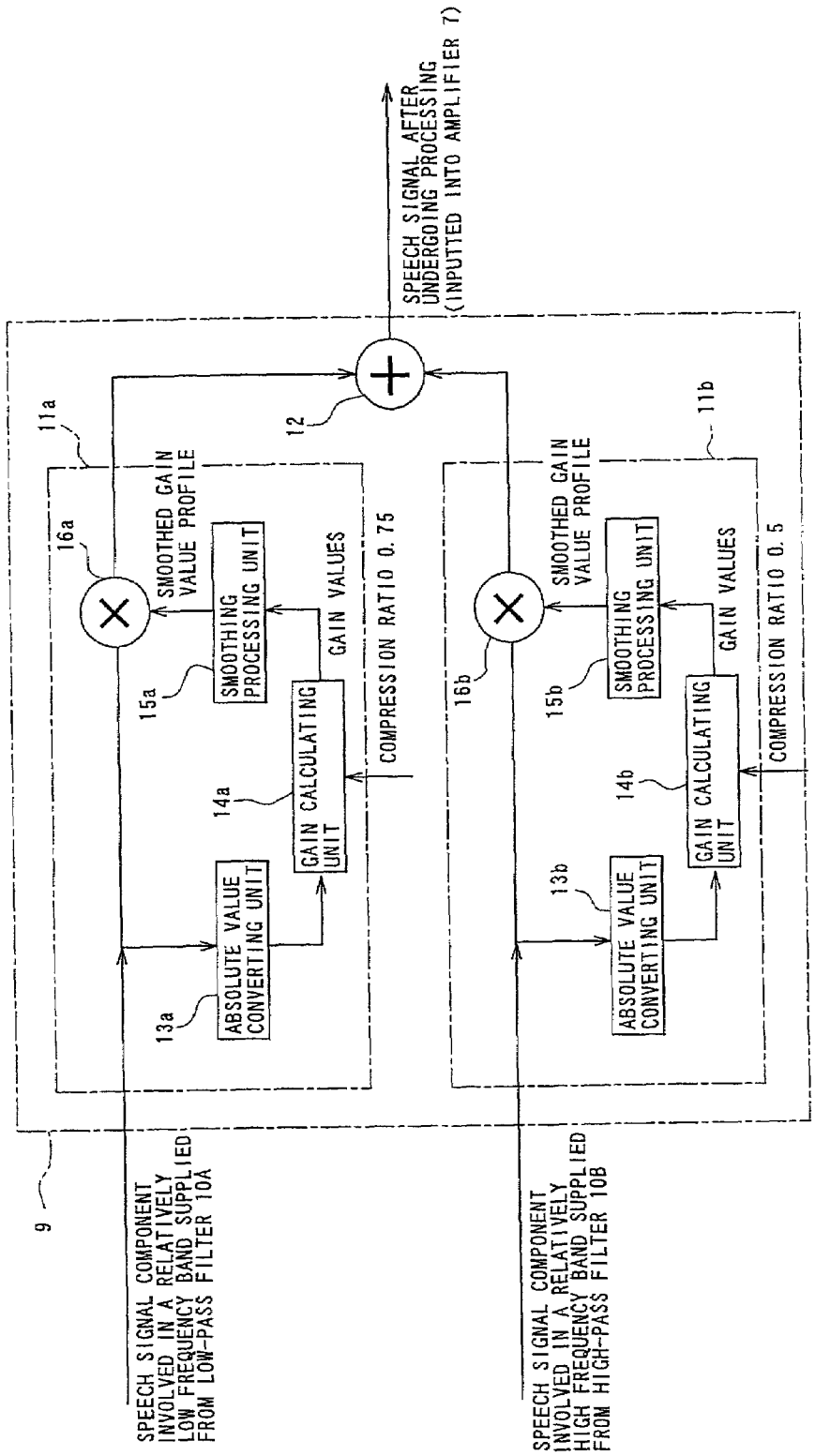
FIG. 3 is a block diagram of a received speech signal compressing unit according to the first embodiment of the present invention.

FIG. 3 is a diagram showing in detail the arrangement of the received speech signal compressing unit 9. As shown in FIG. 3, the received speech signal compressing unit 9 is arranged to include the received speech signal compression processing units 11a and 11b and an adding unit 12. The received speech signal compression processing unit 11a is a unit for effecting compression processing on the received speech signal component involved in the low frequency band deriving from the partitioning of the frequency band partitioning unit 8. Thus, the received speech signal compression processing unit is arranged to include an absolute value converting unit 13a, a gain calculating unit 14a, a smoothing processing unit 15a and a multiplying unit 16a.

The absolute value converting unit 13a is a unit for effecting an absolute value conversion on the partitioned speech signal component to detect an instant level of the partitioned speech signal component. That is, the absolute value converting unit 13a effects absolute value conversion on the speech signal component involved in the low frequency band supplied from the low-pass filter 10a to detect the instant level of the speech signal component having undergoing the absolute value conversion.

The gain calculating unit 14a is a unit for carrying out calculation for determining a gain value profile for calculating a gain value by which the partitioned speech signal component is amplified to reach a target level, based on the instant level of the partitioned speech signal component detected by the absolute value converting unit 13a. In this embodiment, the compression ratio is set to 0.75. FIG. 5(*a*) is a diagram showing one example of a relationship between an input level at the gain calculating unit 14a and the target output level. FIG. 5(*b*) is a diagram showing one example of a relationship between an input level at the gain calculating unit 14a and an amplified gain value. The gain calculating unit 14a is arranged to calculate the gain value based on the functions illustrated in FIGS. 5(*a*) and 5(*b*). In FIG. 5(*a*), bold lines indicate the relationship between the level of the inputted speech signal and the targeted level of the speech signal to be outputted. Also, the broken line in the same figure indicates the relationship between the outputted speech signal level when no compression processing is effected (this level is equivalent to the input speech signal level) and the level of the speech signal to be outputted. In this case, the compression ratio means a ratio of the targeted level of the signal to be outputted with respect to the outputted signal level when no compression processing is effected thereon. That is, in the case of FIG. 5(*a*), when the input level is of −60 [dB], the relationship between the targeted level of the signal to be outputted and the outputted signal level when no compression processing is effected can be expressed as Equation (1).

(the targeted level of the signal to be outputted):(the outputted signal level when no compression processing is effected) (input level)=−45:−60=3:4=0.75:1     (1)

As will be understood from the above Equation (1), the compression ratio means an index for making the input level reach the output level.

In this way, the targeted output speech signal level is uniquely determined in accordance with the level of the input speech signal, and the length of L1 in the figure (indicating the difference between the level of the output speech signal and the level of the input speech signal) can be made indicative of the gain value. As a result, as shown in FIG. 5(b), the gain value is uniquely determined based on the input speech signal, and calculated as a gain by the gain calculating unit 14a.

In more concretely, if the level of the inputted speech signal takes a value of −60 [dB], since the compression ratio of the gain calculating unit 14a is set to 0.75, the target level becomes −45 [dB] (see FIG. 5(a)), and the length of L1 is made indicative of the gain value. As a result, the gain value is determined to be 15 [dB] (see FIG. 15(b)). Further, as will be described later on, the compression ratio of the gain calculating unit 14a is set to be larger than that of the gain calculating unit 14b on the higher frequency band side so that the resulting gain value becomes small. While in the present embodiment the compression ratio is set to 0.75, the compression ratio is not limited to the value but it can be set to any other value.

The smoothing processing unit 15a (see FIG. 3) is a unit for effecting a smoothing processing on the gain value calculated by the gain calculating unit 14a. In this case, the smoothing processing is a processing for smoothing the variation of the calculated gain values so that abrupt change in rising or falling of the gain value calculated by the gain calculating unit 14a can be modestly suppressed. This smoothing processing is controlled based on the following Equation (2).

(gain output)=(gain value at that timing point)×a0+ (gain value taken soon before that timing point)×a1     (2)

In this case, a0 and a1 are coefficients for adjusting the degree of the smoothing processing, respectively. For example, if a large degree of smoothing processing is requested for the gain value, in Equation (2), the coefficient a0 multiplied together with gain value at that timing point is made small while the coefficient a1 multiplied together with gain value taken soon before that timing point is made large. Thus, the gain value taken soon before that timing point is weighted so that the degree of smoothing is enlarged. Conversely, if it is requested to lessen the degree of smoothing, then the coefficient a0 is made large and the coefficient a1 is made small. In more concretely, the coefficients a0 and a1 can be determined in accordance with the following Equations (3) and (4).

$$a0 = \exp(-1.0/(sf \times X + 1.0))$$     (3)

$$a1 = 1.0 - a0$$     (4)

where "exp" represents an exponential function, sf is a sampling frequency, X is a time it takes to reach the target level. For example, if the rising response of the speech signal is designed so that it reaches the target gain by about several milliseconds (hereinafter denoted as "ms") and the falling response of the same is designed so that it decreases down to a desired bottom by about several tens to hundreds milliseconds, the distortion of the speech signal can be effectively suppressed. While in the present embodiment the rising response is set to 1 ms and the falling response is set to 100 ms, these responses are not limited to the above values but they can be set to any other values.

The multiplying unit 16a is a unit for multiplying the gain value having undergone the smoothing in the smoothing processing unit 15a and the partitioned speech signal together and outputting the resultant product as a speech signal after processing.

Similarly to the received speech signal compression processing unit 11a, the received speech signal compression processing unit 11b is a unit for compressing the partitioned speech signal in correspondence to the high frequency band deriving from the partitioning of the frequency band partitioning unit 8. The received speech signal compression processing unit 11b is arranged to include an absolute value converting unit 13b, a gain calculating unit 14b, a smoothing processing unit 15b and a multiplying unit 16b. The received speech signal compression unit 11b has the same arrangement as that of the received speech signal compression processing unit 11a which effects the compression processing on the low frequency band signal passing through the low-pass filter 10a. As will be described alter on, only the point that differs in the arrangement is the compression ratio set in the gain calculating unit 14b.

The absolute value converting unit 13b is a unit for effecting an absolute value conversion on the partitioned speech signal so as to detect an instant level of the partitioned speech signal. Owing to the absolute value converting unit 13b, the speech signal having passed through the high-pass filter 10b is subjected to the absolute value conversion, whereby it becomes possible to detect the instant level of the speech signal subjected to the absolute value conversion.

Figure 6:
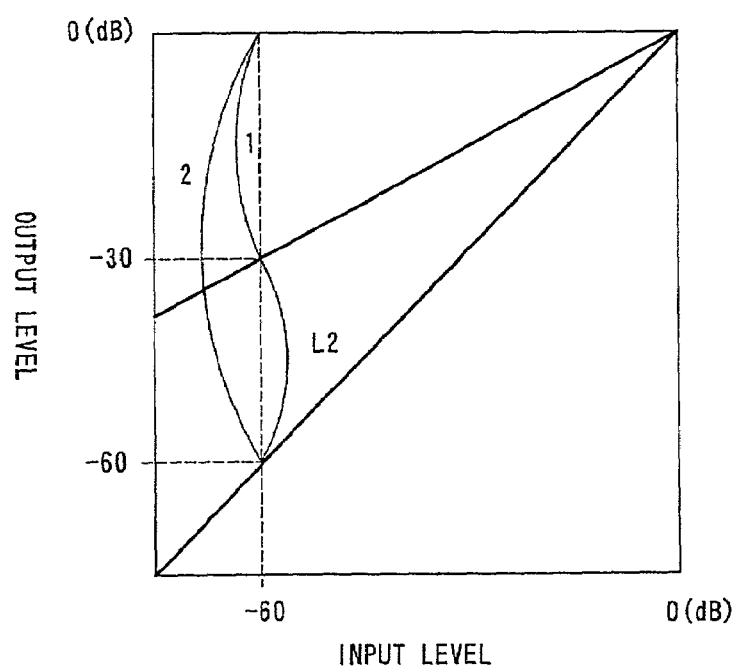
FIG. 6(a) is a diagram showing one example of a relationship between an input level and a target output level of the gain calculating unit.
FIG. 6(b) is a diagram showing one example of a relationship between an input level and an amplified gain value of the gain calculating unit.
Figure 6:
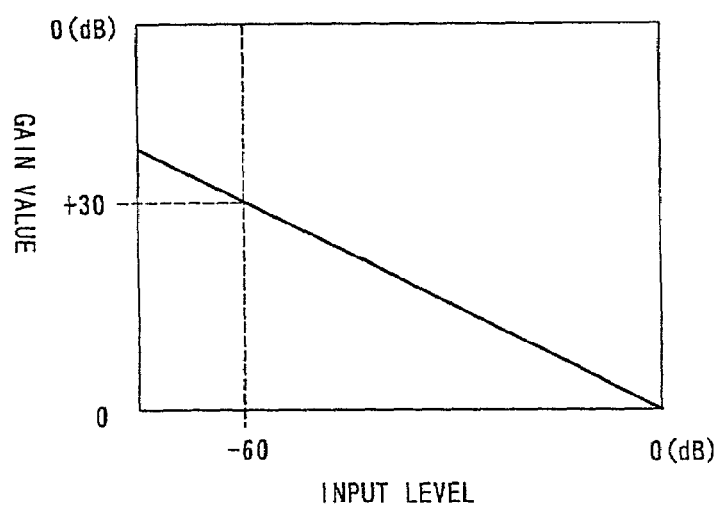

The gain calculating unit 14b is a unit for carrying out calculation for determining a gain value profile by which the partitioned speech signal component is amplified to reach the target level, based on the instant level of the partitioned speech signal component detected by the absolute value converting unit 13b. In the present invention, the compression ratio is set to 0.5. Similarly to FIGS. 5(a) and 5(b), FIG. 6(a) is a diagram showing one example of the relationship between the input level at the gain calculating unit 14b and the target output level of the same. FIG. 6(b) is a diagram showing one example of the relationship between the input level at the gain calculating unit 14b and the gain value to be amplified. For example, in FIG. 6(a), if the input speech signal level takes a level of −60 [dB], since the compression ratio of 0.5 is set in the gain calculating unit 14b, the target level becomes a level of −30 [dB]. Then, the length of L2 is made to be indicative of a gain value. As a result, the gain value is determined to be 30 [dB] by calculation (see FIG. 6(b)). At this time, the compression ratio in the gain calculating unit 14b is set to 0.5. This is because the speech signal in the high frequency band of 2000 Hz or more having passed through the high-pass filter 10b is small as compared with the speech signal in the low frequency band of 2000 Hz or below having passed through the low-pass filter 10a, and hence the speech signal in the high frequency band can be influenced from a masking effect caused by the surrounding noise with ease. Accordingly, the compression processing is effected at a relatively small compression ratio so that the received speech signal can be amplified greatly.

The smoothing processing unit 15b is a unit for effecting the smoothing processing on the gain value deriving from the calculation by the gain calculating unit 14b. Further, the multiplying unit 16b is a unit for multiplying the partitioned speech signal with the gain value profile having undergone the smoothing processing in the smoothing processing unit 15b and outputting the speech signal after the processing as an output.

The adding unit 12 is a unit for adding the speech signal components having undergone the processing supplied from the received speech signal compression processing units 9a and 9b together so as to restore a speech signal waveform as a speech signal having undergone the compression processing effected on each partitioned speech signal component. Then, the adding unit supplies the adding result to the amplifier 7.

With the above arrangement, the compression processing can be effected on each of the partitioned speech signal components involved in the low-frequency band (2000 Hz or below) and the high frequency band (2000 Hz or more).

It is not always requested to construct a particular hardware arrangement in order to effect the above-described compression processing. That is, the same compression processing can be effected by means of a program processing effected in a DSP (Digital Signal Processor) or the like. FIG. 7 illustrates a scheme of the processing effected by the DSP or the like.

Initially, one sample of received speech signal data is supplied (step A1). The speech signal data is subjected to one of channels for band-pass filter processing prepared for a plurality of bands (e.g., a low frequency band and a high frequency band, or a low frequency band, intermediate frequency band and a high frequency band) (step A2). At step A3, it is determined whether or not the band-pass filter processing has been completed in all of the band-pass filter channels. If it is determined that there is any band-pass filter channel in which the filter processing is undone, then NO route is taken and the filter processing is effected in the next band-pass filter channel (step A4). Conversely, at step A3, if it is determined that the band-pass filter processing has been completed in all of the band-pass filter channels, i.e., the speech signal data has been completely partitioned into the plurality of frequency bands, then YES route is taken and the processing proceeds to step A5, in which the speech signal components are subjected to the compression processing in the respectively assigned frequency bands at respectively prescribed compression ratio. At step A6, it is determined whether all of the partitioned speech signal data pieces have been subjected to the speech signal compression processing or not. If it is determined that the speech signal compression processing is not completed for all of the frequency bands, then NO route is taken. At step A7, the speech signal compression processing begins with the next band of the speech signal. Conversely, if it is determined that the speech signal compression processing has been completed for all of the frequency bands, then YES route is taken at step A6, and the processing proceeds to the next step in which the outputs of all bands having undergone the compression processing are added together to create a synthesized output (step A8). A speech signal waveform deriving from the addition and synthesis is outputted (step A9), and at step A10, whether this processing has been completed or not is examined. If it is determined that the processing has been completed, then YES route is taken. If it is determined that the processing has not been completed, then NO route is taken, and the processing resumes at step A1.

Figure 8:
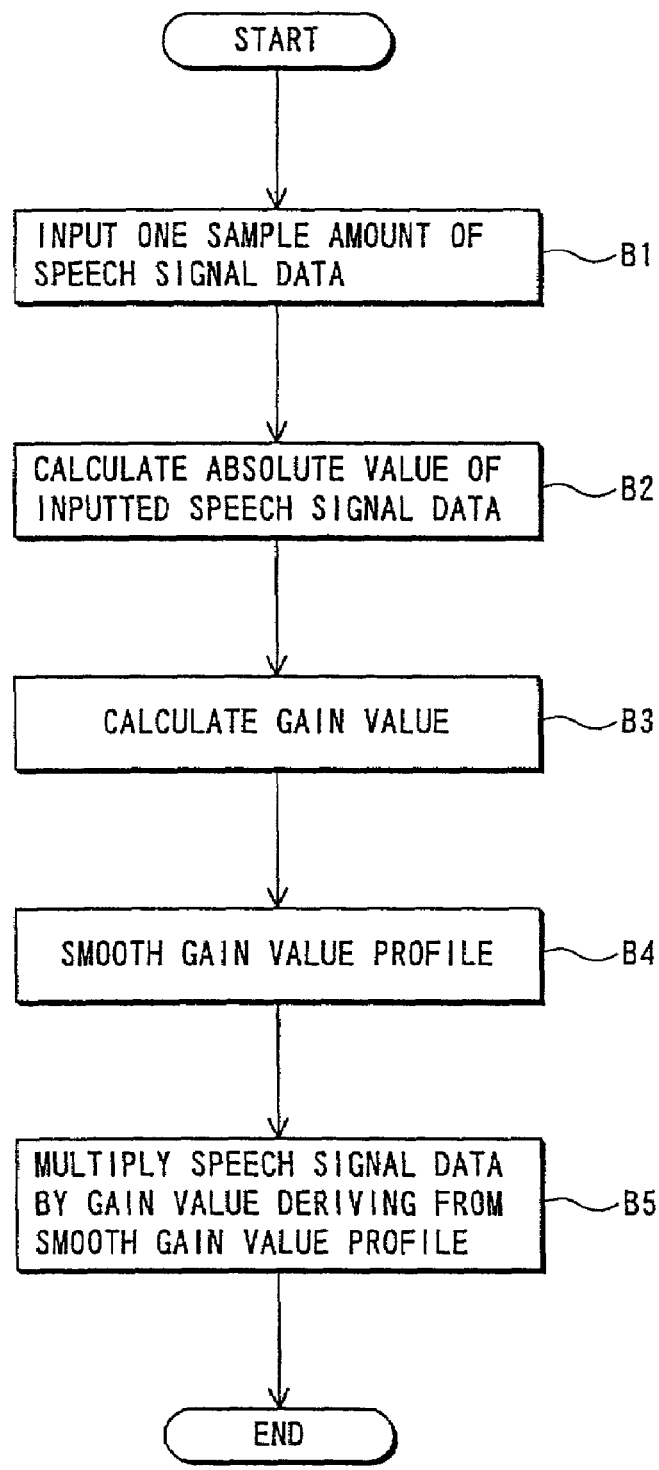
FIG. 8 is a flowchart for explaining a compression processing effected on each frequency band of the first embodiment of the present invention.

FIG. 8 is a flowchart for explaining the compression processing of each frequency band employed in the first embodiment of the present invention. The processing illustrated in FIG. 8 corresponds to the processing effected in step A5 of FIG. 7.

That is, at step A5 of FIG. 7, the compression processing is effected on the speech signal component in a single frequency band. In more detail, of the speech signal data pieces deriving from the partition into the plurality of frequency bands, a speech signal data piece in a single frequency band is inputted (step B1), and the absolute value of the speech signal data piece is calculated (step B2). Then, calculation is carried out to determine a gain value of an instant level of the calculated absolute value (step B3), and further the gain value is subjected to the smoothing processing (step B4). The gain value having undergone the smoothing processing is multiplied with the speech signal data (step B5). Thus, the compression processing is completed for a single frequency band.

Figure 9A:
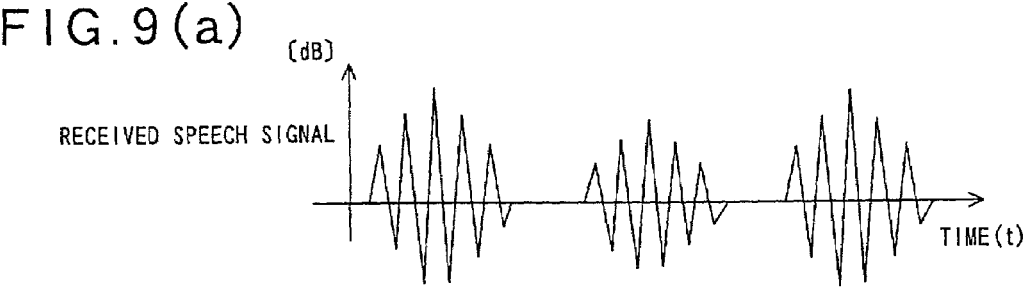
FIGS. 9(a) to 9(e) are diagrams each showing a signal waveform of each unit of the received speech signal processing unit according to the first embodiment of the present invention.
Figure 9B:
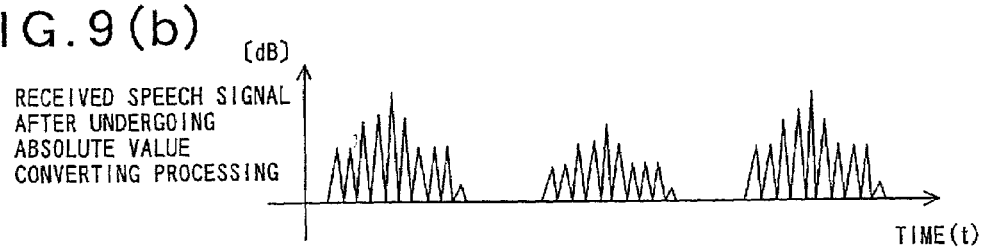
Figure 9C:
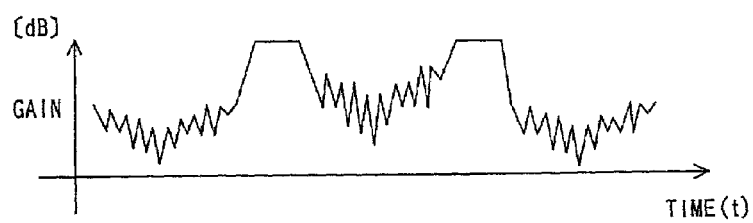
Figure 9D:
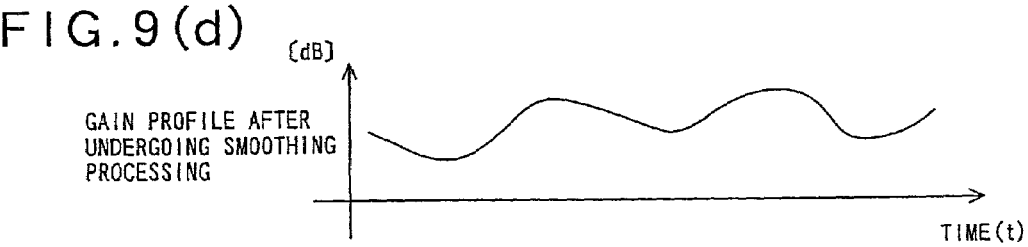
Figure 9E:
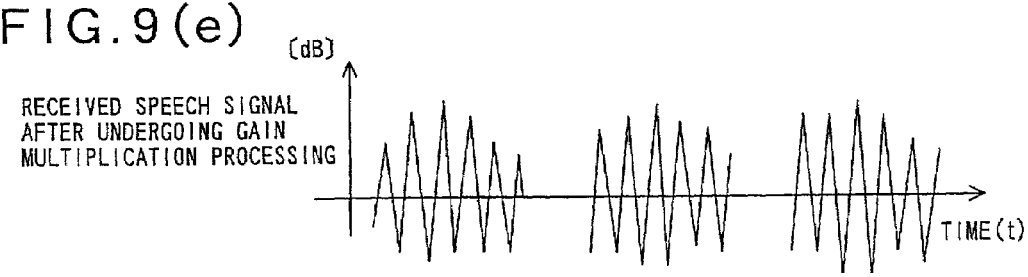

FIGS. 9(a) to 9(e) are diagrams for explaining how a signal waveform changes owing to the processing effected on the speech signal in the received speech signal compression processing unit 9 according to the first embodiment of the present invention. Of these diagrams, FIG. 9(a) is a diagram showing a waveform of the speech signal inputted into the received speech signal processing unit 9, FIG. 9(b) is a diagram showing a waveform of the speech signal after undergoing the processing in the absolute value converting unit 13a or 13b, FIG. 9(c) is a diagram illustrative of a gain value profile calculated by the gain calculating unit 14a or 14b, FIG. 9(d) is a diagram showing a waveform of the speech signal after undergoing the processing in the smoothing processing unit 15a or 15b, and FIG. 9(e) is a diagram showing a waveform of the speech signal after undergoing the gain multiplication in the multiplying unit. Now, description will be made hereinafter on the speech signal processing in the received speech signal compression processing unit 11a, 11b with reference to FIGS. 9(a) to 9(e).

Initially, the received speech signal (FIG. 9(a)) of the low frequency band of 2000 Hz or below passing through the low-pass filter 10a is supplied to the absolute value converting unit 13a (see FIG. 3) in which the speech signal is subjected to the absolute value conversion, with the result that the speech signal comes to have a rectified waveform as shown in FIG. 9(b). The speech signal having undergone the absolute value conversion in the absolute value converting unit 13a is supplied to the gain calculating unit 14a in which the gain value of the rectified waveform is calculated (e.g., gain value (FIG. 9(c) is calculated based on the instant level of FIG. 9(b)). The gain value profile deriving from the calculation (FIG. 9(c)) is supplied to the smoothing processing unit 15a in which the gain value profile is subjected to the smoothing processing, with the result that a gain value profile after undergoing the smoothing processing can be obtained as shown in FIG. 9(d). In the multiplying unit 16a, the received speech signal (FIG. 9(a)) is multiplied with the gain value profile (FIG. 9(d)) having undergone the smoothing processing in the smoothing processing unit 15a. The resultant speech signal is supplied to the adding unit 12 as a speech signal after the processing as shown in FIG. 9(e).

On the other hand, the received speech signal of the high frequency band of 2000 Hz or more passing through the high-pass filter 10b is supplied to the received speech signal compression processing unit 11b. Then, the speech signal is subjected to a processing similar to that of the received speech signal compression processing unit 11a. That is, in the absolute value converting unit 13b, the inputted speech signal (FIG. 9(a)) is subjected to the absolute value conversion, with the result that the speech signal comes to have a waveform (FIG. 9(b)). The gain calculating unit 14b carries out calculation to create the gain value profile (FIG. 9(c)) based on the instant level of the speech signal (FIG. 9(b)) after undergoing the absolute value conversion. Then, the smoothing processing unit 15b effects the smoothing processing on the gain value profile (FIG. 9(c)) created by calculation of the gain calculating unit 14b. In the multiplying unit 16b, received speech signal of the high frequency band of 2000 Hz or more (FIG. 9(a)) is multiplied with the gain value profile (FIG. 9(d)) having undergone the smoothing processing. The resultant speech signal is supplied to the adding unit 12 as a speech signal after the processing as shown in FIG. 9(e).

When the speech signal is supplied to the received speech signal compression processing units 11a and 11b, the speech signal undergoes the compression processing at different compression ratios, respectively. Therefore, the waveforms created by the received speech signal compression processing units 11a and 11b are different from each other, and hence the common figures (FIGS. 9(a) to 9(e)) are not illustrative of the waveforms created by the received speech signal compression processing units in strict sense of words. However, since these figures show the outline of each waveform satisfactorily, description has been done without preparing waveform diagrams for both of the processing channels for the sake of convenience.

Both of the speech signals having undergone the processing in the received speech signal compression processing unit 9a and the received speech signal compression processing unit 9b are supplied to the adding unit 12 and added together to create a synthesized speech signal in this unit. The synthesized speech signal of which components are compressed in the respective frequency bands and added together, is converted into analog data by the digital-to-analog converter 26', and then amplified by the amplifier 7 and outputted from the speaker 7.

Figure 10A:
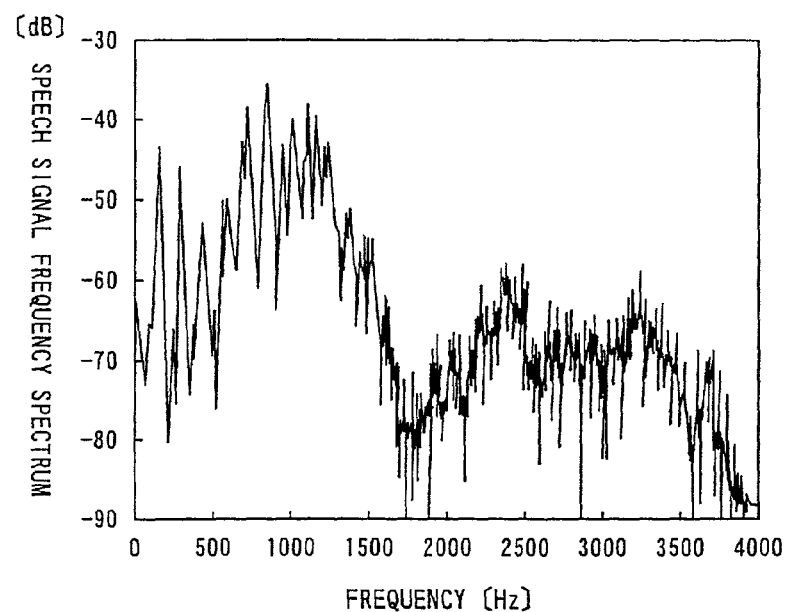
FIG. 10(a) is a diagram showing one example of a speech signal frequency spectrum before the speech signal undergoes the compression processing according to the first embodiment of the present invention.
Figure 10B:
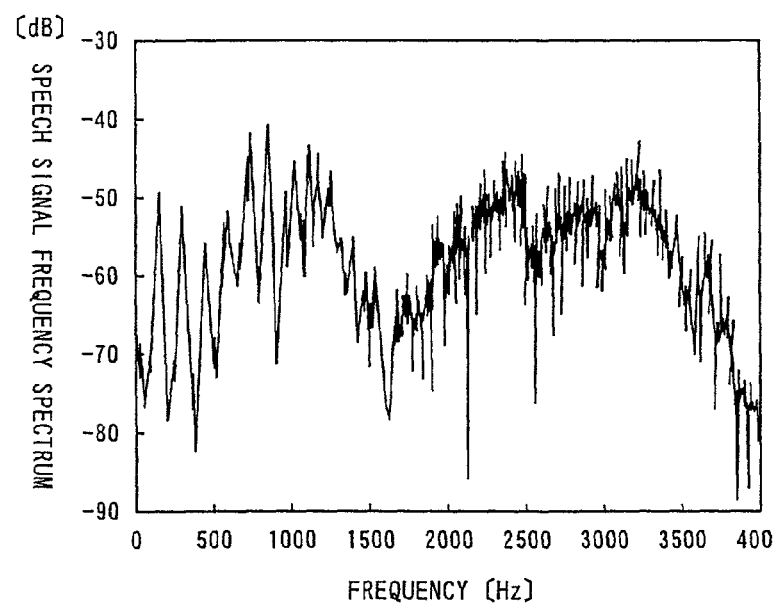
FIG. 10(b) is a diagram showing one example of a speech signal frequency spectrum after the speech signal undergoes the compression processing according to the first embodiment of the present invention.

FIG. 10(a) is a diagram showing one example of a speech signal frequency spectrum before each of the speech signal components undergoes the compression processing in a corresponding frequency band according to the first embodiment of the present invention. FIG. 10(b) is a diagram showing one example of a speech signal frequency spectrum after each of the speech signal components undergoes the compression processing in a corresponding frequency band according to the first embodiment of the present invention. As will be understood from FIGS. 10(a) and 10(b), the received speech signal of the low frequency band of 2000 Hz or below is not amplified very much while the received speech signal of the high frequency band of 2000 Hz or more is emphasized in comparison with the former one.

Figure 11:
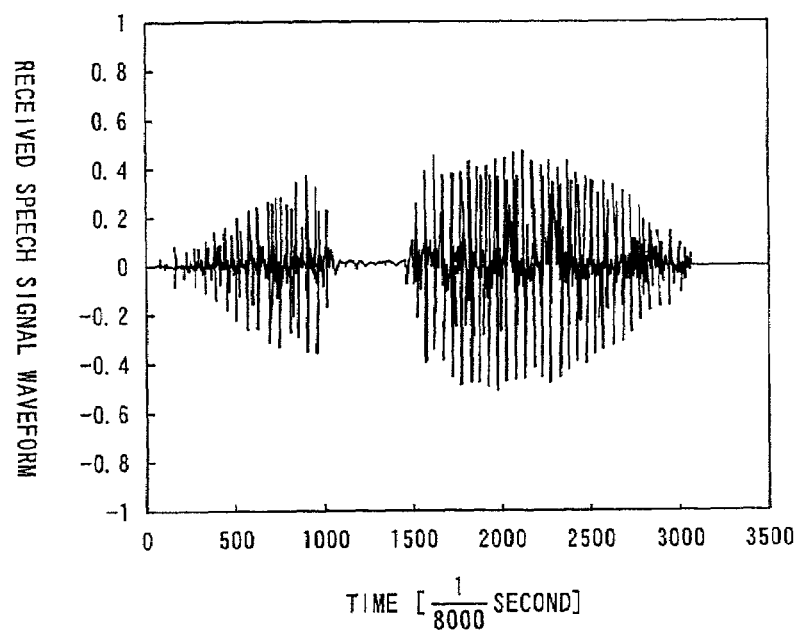
FIG. 11(a) is a diagram showing one example of a received speech signal waveform before the speech signal undergoes the compression processing according to the first embodiment of the present invention.
FIG. 11(b) is a diagram showing one example of a received speech signal waveform after the speech signal undergoes the compression processing according to the first embodiment of the present invention.
Figure 11:
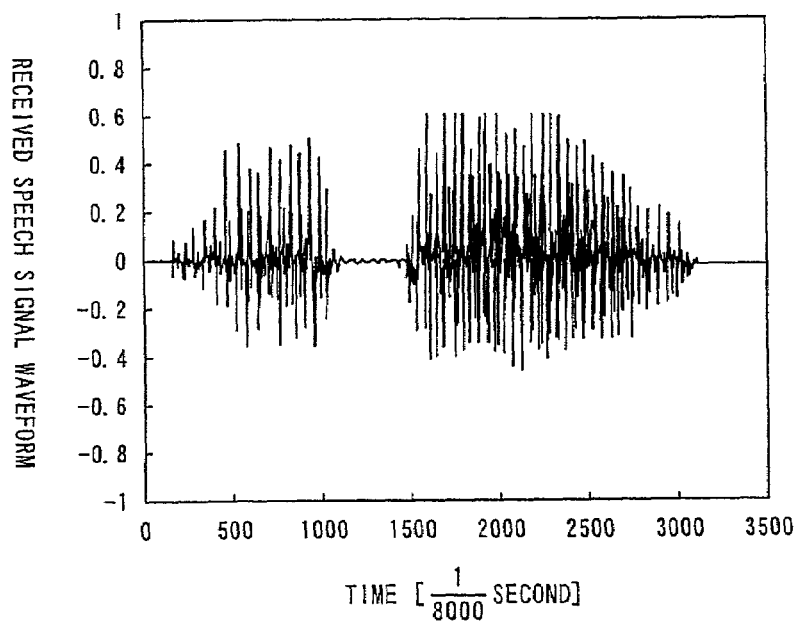

FIG. 11(a) is a diagram showing one example of a received speech signal waveform before each of the speech signal components undergoes the compression processing in a corresponding frequency band according to the first embodiment of the present invention. FIG. 11(b) is a diagram showing one example of a received speech signal waveform after each of the speech signal components undergoes the compression processing in the corresponding frequency band according to the first embodiment of the present invention. In FIGS. 11(a) and 11(b), the abscissa indicates the time axis and a unit length of the abscissa represents 1/8000 second. Also, the ordinate indicates a value of amplitude of the received speech signal waveform (non-dimensional) and the maximum value thereof is set to 1.0. As will be understood from FIGS. 11(a) and 11(b), the speech signal waveform is amplified so as to emphasize the rising profile and falling profile remarkably.

FIG. 12 is a table showing a result of speech articulation test about the speech signal which undergoes the compression processing separately effected on respective bands according to the first embodiment of the present invention. This test was carried out under condition that four people tried to listen to the speech through the subject mobile communication terminal under certain noise environment and evaluated the articulation of the speech from the scoring on a maximum scale of 70 points. As will be observed from FIG. 12, when the four people tried to listen to the speech under no noise environment, the scores given by the four people on the speech without undergoing the compression processing and the speech having undergone the compression processing were substantially equal to each other. However, when the four people tried to listen to the speech under the environment of a noise type A, the evaluation score remarkably increases from 48.75 to 60.00. Furthermore, when the four people tried to listen to the speech under the environment of a noise type B, the evaluation score also remarkably increases from 52.50 to 61.00. This result proves a great progress in the articulation.

As described above, according to the received speech signal processing apparatus or the received speech signal reproducing apparatus of the present embodiment, the received speech signal is partitioned into a plurality of components each involved in respective frequency bands, and the compression processing is properly effected in the respective partitioned frequency bands. That is, the amplification is intensively effected on the received speech signal component involved in a relatively high frequency band in which the speech signal tends to be influenced from the masking effect caused by the surrounding noise. Conversely, the amplification is moderately effected on the received speech signal component involved in a relatively low frequency band in which the speech signal will not be influenced seriously from the masking effect caused by the surrounding noise. In this way, it becomes possible to effect the compression processing properly on the received speech signal depending on the frequency characteristic of the speech signal. As a result, the speech signal can be reproduced articulately.

As described above, the scheme of the compression processing on the received speech signal according to the present embodiment does not depend on the variation in the surrounding noise volume. Therefore, it becomes unnecessary for the mobile communication terminal to be provided with a circuit or a software for discriminating the received speech signal from the surrounding noise or detecting the level of the surrounding noise.

(B) Description of Second Embodiment of the Present Invention

Figure 13:
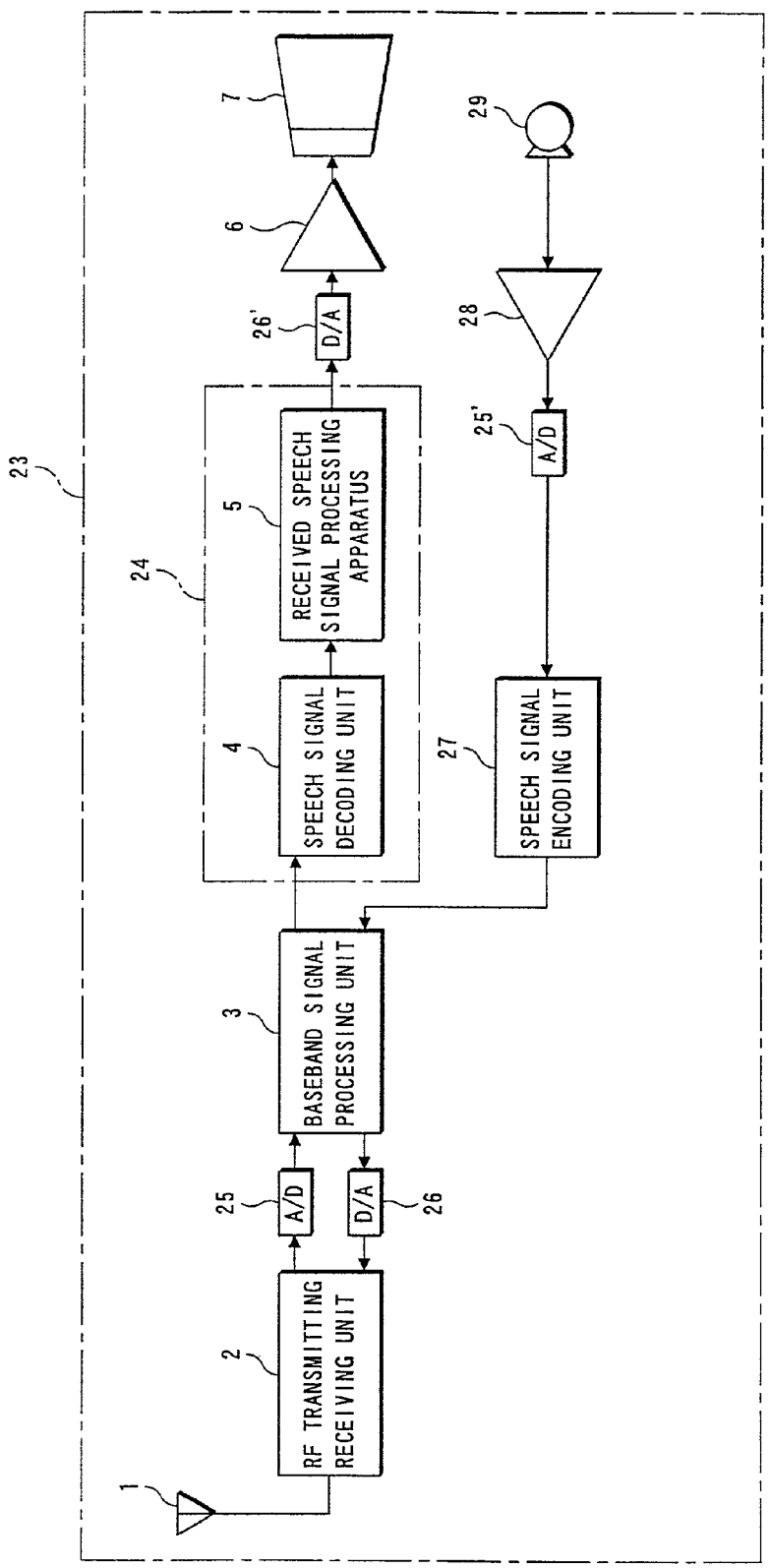
FIG. 13 is a block diagram showing a mobile communication terminal according to a second embodiment of the present invention.

FIG. 13 is a block diagram of a mobile communication terminal 23 according to a second embodiment of the present invention. The mobile communication terminal 23 is an apparatus which is capable of transmitting or receiving signals such as speech signals by means of a radio wave signal. As shown in FIG. 13, the mobile communication terminal 23 is arranged to include the antenna 1, the RF transmitting receiving unit 2, the analog-to-digital converter 25, the digital-to-analog converter 26, the baseband signal processing unit 3, a received speech signal reproducing apparatus 24, the digital-to-analog converter 26', the amplifier 6, the speaker 7, the transmitting microphone 29, the amplifier 28, the analog-to-digital converter 25', and the speech signal encoding unit 27.

The antenna 1 is a device for transmitting and receiving a radio signal. The RF transmitting receiving unit 2 is a unit for demodulating an RF signal received by the antenna 1 or modulating digital data supplied from the digital-to-analog converter 26 to form an RF signal. The analog-to-digital converter 25 is a unit for converting a signal supplied from the RF transmitting receiving unit 2 into digital data. The baseband signal processing unit 3 is a unit for subjecting a signal from the analog-to-digital converter 25 to a baseband processing and also subjecting a signal from the speech signal encoding unit 27 to the baseband processing.

The received speech signal reproducing apparatus 24 is a section for decoding the baseband signal into a received speech signal and subjecting the decoded speech signal to a processing for emphasizing a formant frequency contained in the speech signal so that the articulation of the speech signal is improved. The digital-to-analog converter 26' is a unit for converting the speech signal from the received speech signal reproducing apparatus into analog data. The amplifier 6 amplifies the speech signal which has been formed into analog data by the digital-to-analog converter 26'. Further, the speaker 7 is a unit for emanating a speech of the speech signal outputted from the amplifier 6.

The transmitting microphone 29 is a device for converting a speech of a talker on the transmitting side into a signal. The amplifier 28 is a unit for amplifying the signal from the transmitting microphone 29. The analog-to-digital converter 25' is a unit for converting the signal from the amplifier 28 into digital data. The speech signal decoding unit 27 is a unit for encoding the digital data from the analog-to-digital converter 25'. Further, the digital-to-analog converter 26 is a unit for converting the baseband signal from the baseband signal processing unit 3 into analog data.

In this way, the radio signal received by the antenna 1 is subjected to a demodulating processing in the RF transmitting receiving unit 2. Thereafter, the demodulated output is converted into digital data by the analog-to-digital converter 25. Then, the digital data is subjected to the baseband processing in the baseband signal processing unit 3. The signal having been subjected to the baseband processing is decoded by the speech signal decoding unit 4 so as to restore a received speech signal. This speech signal is subjected to a formant emphasizing processing in the received speech signal processing apparatus 17, and then converted into analog data by the digital-to-analog converter 26'. Thereafter, the analog data is amplified by the amplifier 6 and the speaker 7 emanates the corresponding sound.

On the other hand, a speech signal supplied from the transmitting microphone 29 is amplified by the amplifier 28, and this amplified speech signal is converted into digital data by the analog-to-digital converter 25'. Thereafter, the digital data is encoded by the speech signal encoding unit 27. This encoded speech data is subjected to a baseband processing in the baseband signal processing unit 3. The signal having been undergone the baseband processing is converted into analog data by the digital-to-analog converter 26. The analog data is supplied to the RF transmitting receiving unit 2. Thereafter, the analog data supplied from the digital-to-analog converter 26 is subjected to a modulation in the RF transmitting receiving unit 2 and transmitted away from the antenna 1.

FIG. 14 is a block diagram showing in more detail a receiving section of the mobile communication terminal 23 according to the second embodiment of the present invention. As shown in FIG. 14, the received speech signal reproducing unit 24 is arranged to include the speech signal decoding unit 4 composed of digital circuits and a received speech signal processing unit (received speech signal processing apparatus) 17 also composed of digital circuits. In this case, the speech signal decoding unit 4 is a unit for decoding the encoded speech signal. The received speech signal processing unit (received speech signal processing apparatus) 17 is a unit for detecting a formant frequency contained in the speech signal which has been decoded by the speech signal decoding unit 4 and effecting an emphasizing processing on the received speech signal so that the detected formant frequency is emphasized.

Figure 15:
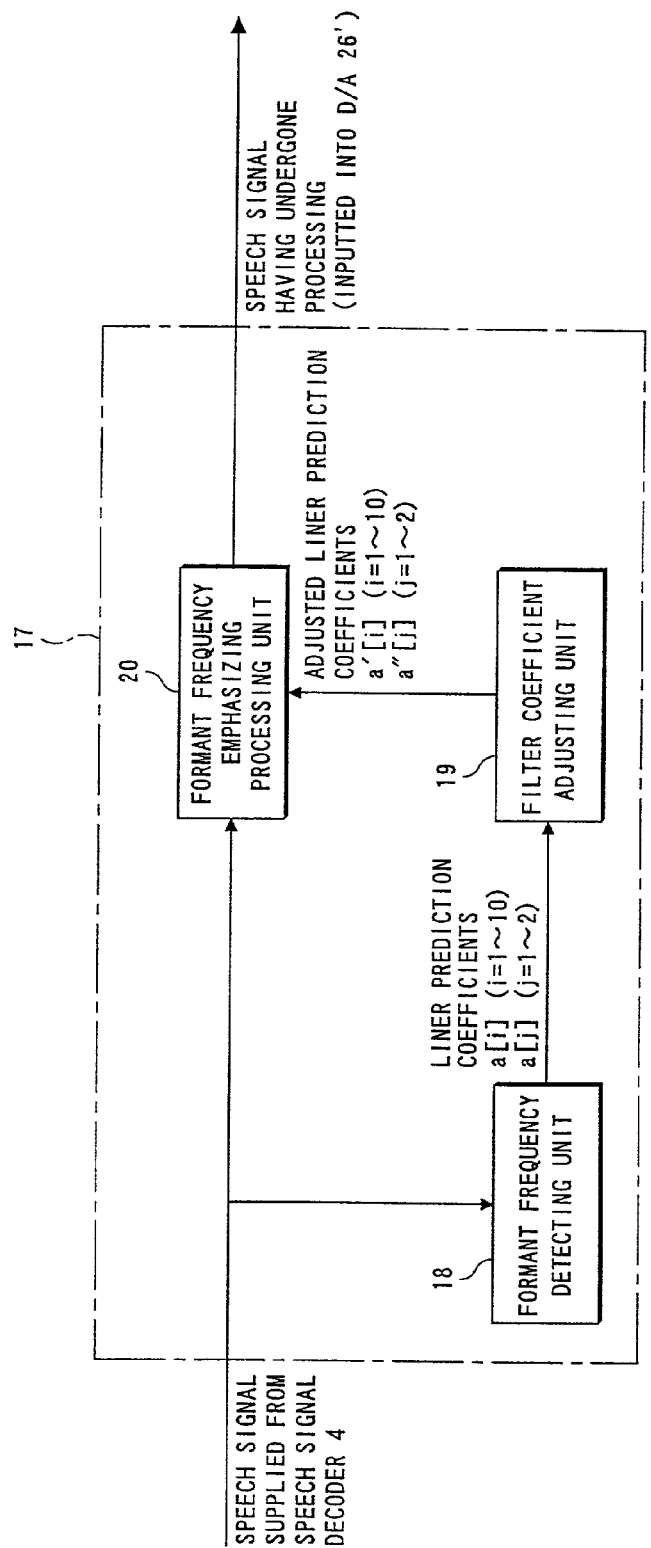
FIG. 15 is a block diagram of a received speech signal processing unit according to the second embodiment of the present invention.

FIG. 15 is a block diagram of the received speech signal processing unit (received speech signal processing apparatus) 17 according to the second embodiment of the present invention. The arrangement of the received speech signal processing unit (received speech signal processing apparatus) 17 shown in FIG. 14 can be illustrated in more detail in FIG. 15. As shown in this figure, this unit is arranged to include a formant frequency detecting unit 18, a filter coefficient adjusting unit 19 and a formant frequency emphasizing processing unit 20.

The formant frequency detecting unit 18 is a unit for detecting a formant frequency contained in the speech signal decoded by the speech signal decoding unit 4.

Figure 16:
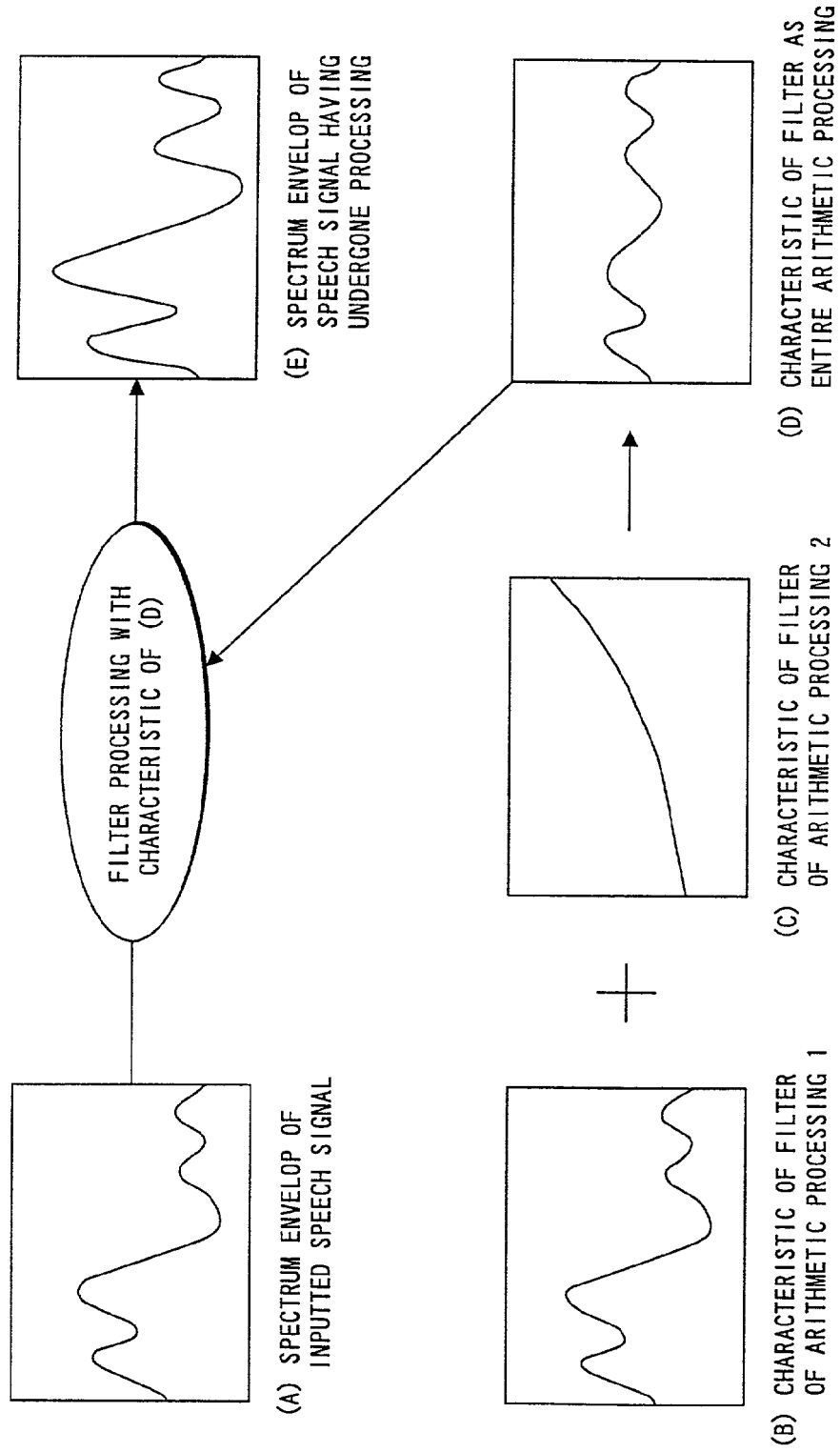
FIG. 16 is a diagram for explaining an action of the received speech signal processing unit according to the second embodiment of the present invention.

FIG. 16(a) is a diagram showing a speech signal frequency spectrum supplied to the received speech signal processing unit 17 according to the second embodiment of the present invention. As shown in FIG. 16(a), four peaks (local peaks) can be observed on the frequency envelop of the speech signal. The term formant frequency means such a peak on the frequency envelop expanded on the frequency axis. If the formant frequencies can be emphasized, it will be expected that sound reproduced from the speech signal can be heard with clarity even if the listener is placed in a noisy environment.

The detection of the formant frequencies can be realized in such a manner that the formant frequency detecting unit 18 is arranged to analyze the frequency profile of the received speech signal and detect the frequency envelope. In more concretely, the formant frequency detecting unit 18 is arranged so that it effects LPC (Linear Prediction Coding) analysis on the received speech signal to calculate a linear prediction coefficient ($\alpha$-parameter). The term LPC analysis is a method for analyzing the current speech signal sample value based on the past sample values by taking advantage of the intimate correlation between adjacent sample values of the speech signal. As an algorithm for determining the linear prediction coefficient, an algorithm of Levinson-Durbin or the like can be employed. That is, the formant frequency detecting unit 18 effects the LPC analysis on the received speech signal to determine the linear prediction coefficients $a[i]$ ($i=1$ to $10$), and acquires frequency envelop information representing the frequency envelop of the speech signal, whereby the formant of the received speech signal can be detected.

The formant frequency determining unit 18 carries out calculation to determine the linear prediction coefficients $a[j]$ ($j=1$ to $2$) of the inputted received speech signal so as to acquire frequency envelop information representing an approximate feature of the frequency envelope of the received speech signal. As will be described later on, the frequency envelop information representing the approximate feature of the frequency envelope is utilized by the formant frequency emphasizing processing unit 20 so that adjustment is effected on the degree of contrast of the formant frequency relative to the frequency profile. In this case, the received speech signal may not be subjected to the LPC analysis. That is, the data deriving from processing of LPC analysis processing effected in the speech signal decoding unit 4 may be introduced.

The filter coefficient adjusting unit 19 is interposed between the formant frequency determining unit 18 and the formant frequency emphasizing processing unit 20. The filter coefficient adjusting unit 19 is a unit for adjusting the linear prediction coefficient calculated by the formant frequency determining unit 18. That is, the filter coefficient adjusting unit 19 adjusts the linear prediction coefficients a[i] (i=1 to 10) and the linear prediction coefficients a[j] (j=1 to 2) calculated by the formant frequency determining unit 18. When this unit carries out adjustment, adjustment is effected on the degree of processing in the formant frequency emphasizing processing unit by the formant frequency emphasizing processing unit 20. Adjusted linear prediction coefficients a' [i] and a"[j] can be given by the following Equations (5) and (6).

$$a'[i]=\alpha^i \times a[i] (i=1 \text{ to } 10)(0 \leq \alpha \leq 1.0) \quad (5)$$

$$a''[j]=\beta^j \times a[j] (j=1 \text{ to } 2)(0 \leq \alpha \leq 1.0) \quad (6)$$

In this case, $\alpha$ and $\beta$ represent coefficients for adjusting the property of filters, respectively. If it is requested to intensify the degree of formant emphasis of arithmetic processing 1 expressed by Equation (5), then $\alpha$ is enlarged. If it is requested to intensify the effect of arithmetic processing 2 expressed by Equation (6), then $\beta$ is enlarged. It is noted that $\alpha$ as a coefficient for adjusting the property of filter is different from the above-described linear prediction coefficient ($\alpha$ as a parameter).

FIG. 16(b) is a diagram showing a frequency characteristic of the arithmetic processing 1 (the meaning of this arithmetic processing 1 will be described later on), FIG. 16(c) is a diagram showing a frequency characteristic of the arithmetic processing 2 (the meaning of this arithmetic processing 2 will also be described later on), FIG. 16(d) is a diagram showing a frequency characteristic of the entire processing system made up of a combination of the arithmetic processing 1 and the arithmetic processing 2, and FIG. 16(e) is a diagram showing a speech signal frequency spectrum after undergoing the entire arithmetic processing. Now, the arrangement of the formant emphasizing processing unit 20 of FIG. 15 will be described in more detail with reference to FIGS. 16(a) to 16(e).

The formant frequency emphasizing processing unit 20 is a unit for emphasizing the formant frequency of the received speech signal detected by the formant frequency detecting unit 18. That is, the formant frequency emphasizing processing unit 20 effects a formant frequency emphasizing processing based on the frequency envelope information acquired by the detection of the formant frequency detecting unit 18. In more concretely, this unit carries out an arithmetic processing expressed by Equation (7).

$$y(t)=(\text{arithmetic processing 1})+(\text{arithmetic processing 2})=-\{a'[1] \times y(t-1)+a'[2] \times y(t-2)+ \ldots +a'[10] \times y(t-10)\}+a''[1] \times x(t-1)+a''[2] \times x(t-2) \quad (7)$$

where a'[i] and a"[j] represent adjusted linear coefficients, y(t) is an output speech signal, x(t) is an input speech signal. If the first half of Equation (7), i.e., $-\{a'[1] \times y(t-1)+a'[2] \times y(t-2)+ \ldots +a'[10] \times y(t-10)\}$ is taken as the arithmetic processing 1 and the latter half of Equation (7), i.e., $a'[1] \times x(t-1)+a''[2] \times x(t-2)$ is taken as the arithmetic processing 2, then it follows that the arithmetic processing 1 is a processing for emphasizing the formant of the received speech signal while the arithmetic processing 2 is a processing for adjusting the degree of emphasis caused by the arithmetic processing 1.

In this case, the arithmetic processing 1 is effected based on the linear prediction coefficient a[i] (i=1 to 10) obtained by the formant frequency detecting unit 18. Thus, as shown in FIG. 16(b), this arithmetic processing has the same frequency envelop characteristic as the frequency envelope (FIG. 16(a)) of the received speech signal. In this way, the formant frequency emphasizing processing unit 20 emphasizes the formant frequency detected by the formant frequency detecting unit 18. At this time, if the effected arithmetic processing is only the arithmetic processing 1, though the speech signal can be subjected to the formant emphasis processing, the formant emphasis processing exerts more intensively at a relatively low frequency band than at a relatively high frequency band. Which fact can lead to a distortion in the reproduced speech corresponding to the low frequency band. Accordingly, it is necessary to adjust the degree of formant emphasis processing at respective frequency bands. The arithmetic processing 2 is carried out to adjust the degree of the formant emphasis processing so that unbalance among the formant emphasis in the respective frequency bands becomes alleviated. Therefore, the expression of the arithmetic processing 2 can be transformed as the following Equation (8).

$$(\text{the arithmetic processing 2})=a''[1] \times x(t-1)+a''[2] \times x(t-2) \times x(t-2)=-\{-\{a''[1] \times x(t-1)+a''[2] \times x(t-2)\}\} \quad (8)$$

In Equation (8), the term $-\{a''[1] \times x(t-1)+a''[2] \times x(t-2)\}$ is equivalent to a frequency envelope deriving from analysis on the speech signal with a secondary linear prediction coefficient. In other words, this arithmetic processing 2 is effected based on the frequency envelope information regarding the approximate profile of the speech signal (FIG. 16(a)), i.e., the formant emphasis processing tends to exert more intensively in its level at a relatively low frequency band than at a relatively high frequency band. Accordingly, it follows that the arithmetic processing 1 is equivalent to a processing that the degree of the arithmetic processing at a relatively low frequency band is moderated while the degree of the arithmetic processing at a relatively high frequency band is intensified.

As described above, when the formant frequency emphasizing processing unit 20 effects an arithmetic processing (FIG. 16(d)), it serves as a filter which is made up of a combination of the arithmetic processing 1 illustrated in FIG. 16(b) and the arithmetic processing 2 illustrated in FIG. 16(c). This arithmetic processing is arranged so that the degrees of the formant emphasis at respective frequency bands become substantially uniform. The received speech signal processing unit (received speech signal processing apparatus) 17 effects the arithmetic processing illustrated in FIG. 16(d) on the inputted speech signal (FIG. 16(a)), with the result that a speech signal having formants emphasized on the frequency domain as shown in FIG. 16(e) is outputted.

The formant emphasizing processing is effected by the arrangement described above.

Figure 17:
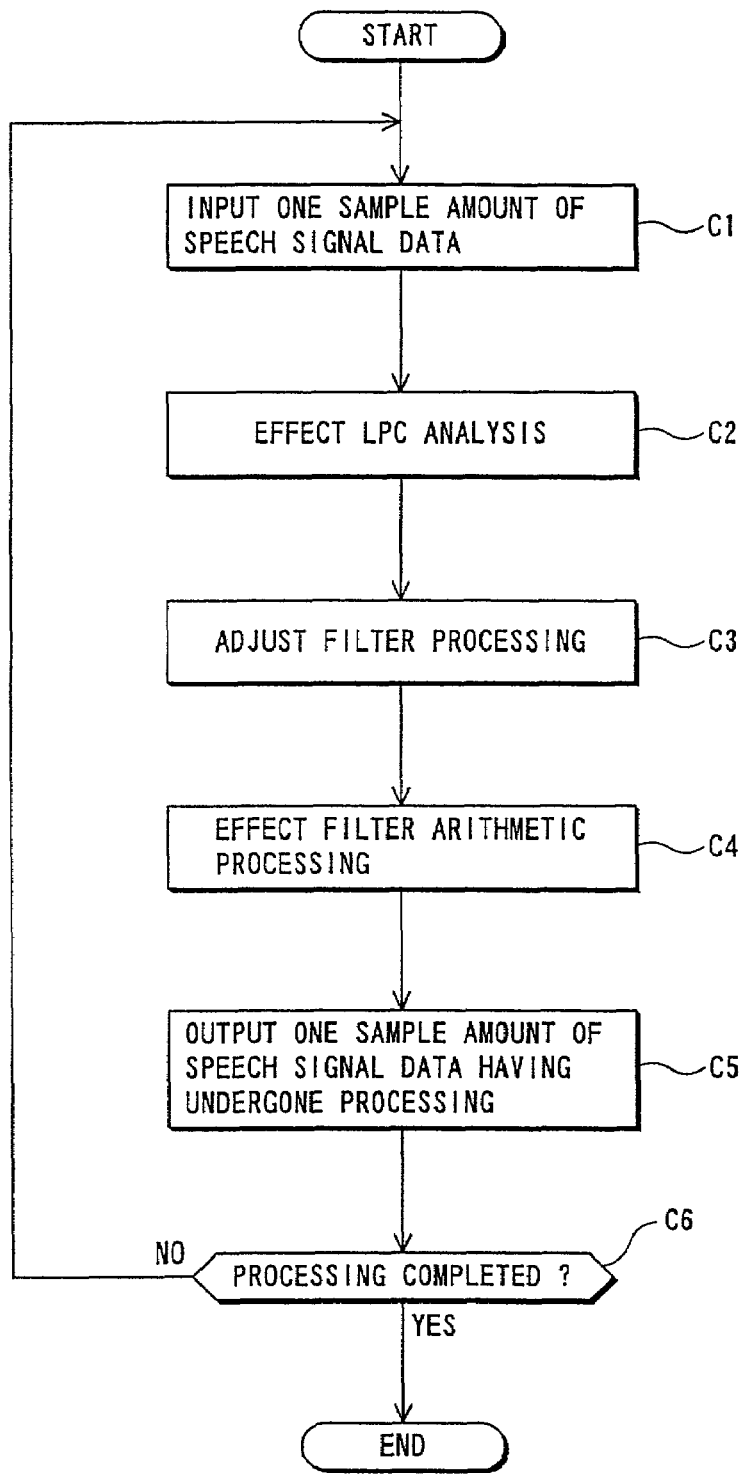
FIG. 17 is a flowchart of a formant emphasizing processing according to the second embodiment of the present invention.

FIG. 17 is a flowchart of the formant emphasizing processing of the second embodiment of the present invention. It is not always requested to construct a particular hardware arrangement in order to effect the above-described formant emphasizing processing. That is, the same formant emphasizing processing can be effected by means of a program processing effected in a DSP or the like.

Initially, one frame amount of frame data of the received speech signal is supplied to the received speech signal processing unit (step C1) in which the LPC analysis is effected on the received speech signal. Thus, the linear prediction coefficients are calculated (step C2). Then, the calculated linear prediction coefficient is multiplied with a coefficient for the filter adjustment (step C3), whereby the degree of arithmetic processing based on the linear prediction coefficient is adjusted. Further, the supplied speech signal frame data is subjected to the arithmetic processing (step C4) and the speech signal resulting from the processing is outputted (step C5). If any data to be processed is left, then NO route is taken at step C6 and the processing starts again at step C1. Conversely, if there is no data to be processed, then YES route is taken at step C6 and this program is terminated.

Figure 18A:
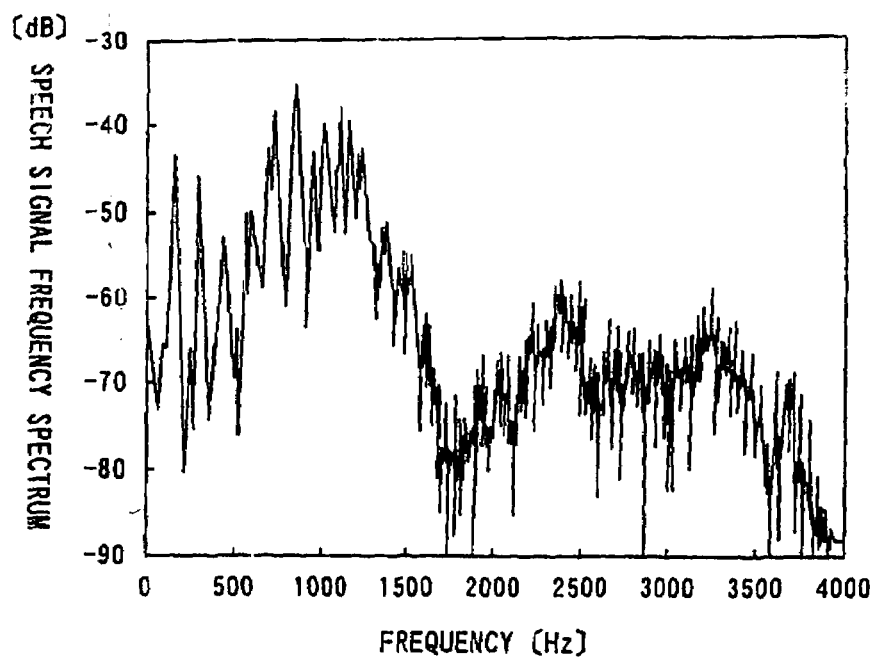
FIG. 18(a) is a diagram showing one example of a speech signal frequency spectrum before the speech signal undergoes the formant emphasizing processing according to the second embodiment of the present invention.
Figure 18B:
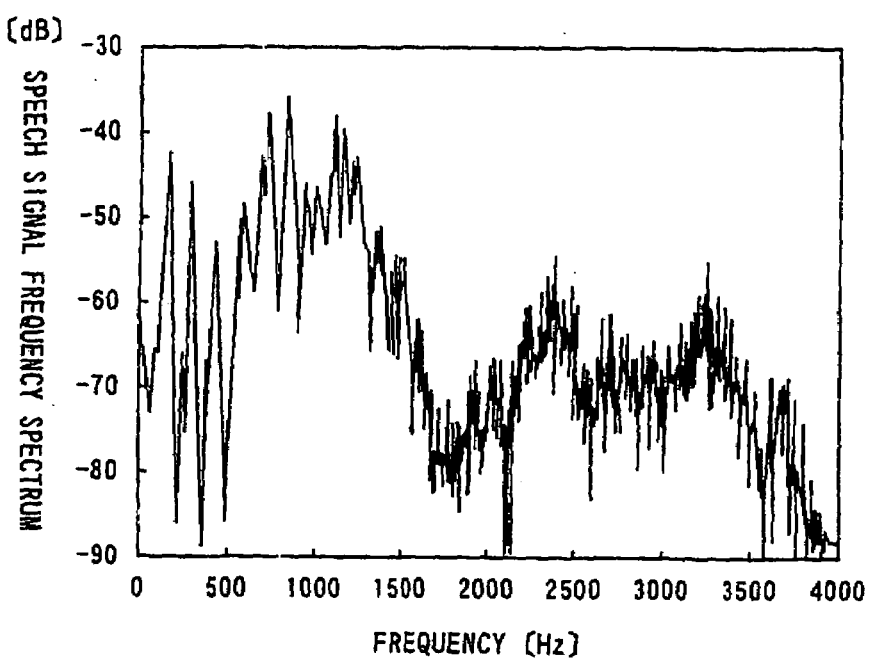
FIG. 18(b) is a diagram showing one example of a speech signal frequency spectrum after the speech signal undergoes the formant emphasizing processing according to the second embodiment of the present invention.

FIG. 18($a$) is a diagram showing one example of a speech signal frequency spectrum before the speech signal undergoes the formant emphasizing processing according to the second embodiment of the present invention. FIG. 18($b$) is a diagram showing one example of a speech signal frequency spectrum after the speech signal undergoes the formant emphasizing processing according to the second embodiment of the present invention. As will be seen from FIGS. 18($a$) and 18($b$), the formants of the received speech signal are emphasized.

FIG. 19 is a table showing a result of speech articulation test about the speech signal which undergoes the formant emphasizing processing according to the second embodiment of the present invention. This test was carried out under condition that four people tried to listen to the speech through the subject mobile communication terminal under certain noise environment and evaluated the articulation of the speech from the scoring on a maximum scale of 70 points.

As will be observed from FIG. 19, when the four people tried to listen to the speech under no noise environment, the scores given by the four people on the speech without undergoing the formant emphasizing processing and the speech having undergone the formant emphasizing processing were substantially equal to each other. However, when the four people tried to listen to the speech under the environment of the noise type A, the evaluation score remarkably increases from 48.75 to 58.50. Furthermore, when the four people tried to listen to the speech under the environment of the noise type B, the evaluation score also remarkably increases from 52.50 to 56.50. This result proves that a great improvement in the articulation was achieved owing to the formant emphasizing processing.

As described above, according to the received speech signal processing unit of the second embodiment of the present invention, the formant frequencies are emphasized, with the result that articulate speech can be reproduced from the received speech signal. Further, the amplifying processing is carried out in not a manner dependent of the change in the surrounding noise but a manner based on the characteristic of the speech signal. Therefore, it becomes possible to reproduce a stable and articulate speech.

(c) Other Disclosure

While several embodiments have been described above, the present invention is not limited to these embodiments but various changes other than the above embodiments can be effected without departing from the gist of the present invention.

For example, the arithmetic processing utilized in the formant emphasizing processing employed in the second modification of the present invention can be modified depending on the frequency characteristics or the like of the received speech signal. In more concretely, the entire arithmetic processing illustrated in FIG. 16($e$) aims at a manner that formants contained in the all frequency bands are emphasized in a substantially uniform manner. However, the entire arithmetic processing may be additionally provided with an arithmetic processing such as the arithmetic processing 2 in which a formant contained in a relatively high frequency band is emphasized. With this modification, the degree of emphasis on the formant becomes greater at the relatively high frequency band than at a relatively low frequency band.

Further, the frequency band partitioning unit 8 and the received speech signal compressing unit 9 provided in the received speech signal processing apparatus 5 (see FIG. 2) may be constructed in a manner of analog system. In this case, it is preferable to provide a digital-to-analog converter between the speech signal decoding unit 4 and the received speech signal processing apparatus.

It is needless to say that the above disclosure provides sufficiently detailed description on the respective embodiments. That is, the above disclosure makes it possible for those skilled in the art to manufacture the received speech signal processing apparatus or the received speech signal reproducing apparatus. Also, the above disclosure makes it possible for those skilled in the art to operate the apparatus.

INDUSTRIAL APPLICABILITY

As described above, according to the present invention, processing is effected depending on the characteristic of the speech signal. Thus, circuits and software can be prevented from being enlarged in size. Accordingly, in a field of mobile communication such as of mobile communication terminals or the like, a great contribution can be expected in small-sizing of equipment and electric power consumption saving. Moreover, according to the present invention, the amplification is not applied on the speech signal uniformly but the amplification is properly applied on the received speech signal depending on the frequency characteristic of the speech signal. Therefore, the received speech signal can be free from distortion and an articulate reproduced speech can be obtained.

The invention claimed is:

1. A received speech signal processing apparatus comprising:
    a formant frequency detecting unit for detecting a formant frequency contained in a received speech signal; and
    a formant frequency emphasizing processing unit for emphasizing the formant frequency, on the received speech signal, detected by the formant frequency detecting unit, wherein
    the formant frequency detecting unit is arranged to analyze the frequency of the received speech signal to detect a frequency envelop of the same received speech signal, and the formant frequency emphasizing processing unit effects the formant frequency emphasizing processing based on information of the frequency envelop detected by the formant frequency detecting unit,
    wherein the formant frequency detecting unit is configured to effect an LPC analysis on the received speech signal and calculate a linear prediction coefficient, and
    a filter coefficient adjusting unit for adjusting the linear prediction coefficient calculated by the formant frequency detecting unit is interposed between the formant frequency detecting unit and the formant frequency emphasizing processing unit.

2. A received speech signal reproducing apparatus, comprising:

a speech signal decoding unit for decoding an encoded received speech signal; and a received speech signal processing unit for detecting a formant frequency contained in the received speech signal decoded by the speech signal decoding unit and emphasizing the detected formant frequency, on the received speech signal, wherein the received speech signal processing unit comprises a formant frequency detecting unit for detecting the formant frequency contained in a received speech signal decoded by the speech signal decoding unit, and a formant frequency emphasizing processing unit for emphasizing the formant frequency, on the received speech signal, detected by the formant frequency detecting unit is configured to analyze the frequency of the received speech signal to detect a frequency envelop of the speech signal, and the formant frequency emphasizing processing unit effects the formant frequency emphasizing processing based on information of the frequency envelop detected by the formant frequency detecting unit, and the formant frequency detecting unit is configured to effect an LPC analysis on the received speech signal and calculate a linear prediction coefficient, and a filter coefficient adjusting unit for adjusting the linear prediction coefficient calculated by the formant frequency detecting unit is interposed between the formant frequency detecting unit and the formant frequency emphasizing processing unit.

* * * * *